(12) United States Patent
Darnell et al.

(10) Patent No.: US 11,953,212 B1
(45) Date of Patent: Apr. 9, 2024

(54) HYDRONIC APPARATUS SUPPORT SYSTEM

(71) Applicants: Brandon Darnell, Carthage, SD (US); David Austerman, Carthage, SD (US)

(72) Inventors: Brandon Darnell, Carthage, SD (US); David Austerman, Carthage, SD (US)

(73) Assignee: Innovative Hydronic Solutions, LLC, Carthage, SD (US)

( * ) Notice: Subject to any disclaimer, the term of this patent is extended or adjusted under 35 U.S.C. 154(b) by 343 days.

(21) Appl. No.: 17/378,912

(22) Filed: Jul. 19, 2021

(51) Int. Cl.
*F16L 3/22* (2006.01)
*F24D 3/10* (2006.01)
*F24D 19/00* (2006.01)

(52) U.S. Cl.
CPC ............ *F24D 3/1058* (2013.01); *F16L 3/221* (2013.01); *F24D 19/0097* (2013.01)

(58) Field of Classification Search
CPC ...... F24D 3/1066; F24D 19/0097; F16L 3/22; F16L 3/221
USPC .......................................................... 248/73
See application file for complete search history.

(56) References Cited

U.S. PATENT DOCUMENTS

| | | | |
|---|---|---|---|
| 3,884,438 A | 5/1975 | Logsdon | |
| 5,390,660 A | 2/1995 | Danielson | |
| 6,557,774 B1 | 5/2003 | Krueger | |
| 7,191,789 B2 | 3/2007 | Corbett, Jr. | |
| 7,661,441 B2 | 2/2010 | Simensen | |
| 2007/0187521 A1 | 8/2007 | Wawak | |
| 2009/0165291 A1 | 7/2009 | Simensen | |
| 2009/0178717 A1 | 7/2009 | Mirchildon | |

FOREIGN PATENT DOCUMENTS

| | | | | |
|---|---|---|---|---|
| AT | 506080 B1 * | 6/2009 | ............. | E03C 1/021 |
| DE | 202020103928 U1 * | 9/2020 | ............. | E03B 7/095 |
| KR | 200195499 Y1 * | 9/2001 | | |
| KR | 20060031745 A * | 4/2006 | | |
| KR | 20180026847 A * | 3/2018 | | |

OTHER PUBLICATIONS

Translation of AT 506080.*
Translation of KR 200195499.*
Translation of KR 20180026847.*

* cited by examiner

*Primary Examiner* — Kevin F Murphy
(74) *Attorney, Agent, or Firm* — Jeffrey A. Prochl; Woods, Fuller, Shultz & Smith, PC

(57) ABSTRACT

A hydronic apparatus support system for supporting a component of a hydronic fluid handling apparatus may comprise a base mounting assembly with a base rail for mounting on a support and forming a ledge, and a base panel supportable on the base rail and having an outer surface with a plurality of mounting apertures being formed in the outer surface. The system may further include at least one component mounting bracket mountable on the base panel to support the component on the base mounting assembly. The component mounting bracket may have at least two holes simultaneously alignable with at least two of the mounting apertures of the plurality of mounting apertures in the base panel to permit a fastener to pass through a hole of the mounting bracket and a mounting aperture of the base panel aligned with each other.

21 Claims, 22 Drawing Sheets

HYDRONIC APPARATUS SUPPORT SYSTEM

BACKGROUND

Field

The present disclosure relates to support systems and more particularly pertains to a new hydronic apparatus support system for simplifying and expediting the mounting of components of a hydronic apparatus on a vertical support.

SUMMARY

In one aspect, the present disclosure relates to a hydronic apparatus support system for supporting at least one hydronic component of a hydronic fluid handling apparatus on a vertical support. The hydronic apparatus support system may include a base mounting assembly for mounting on the vertical support and may comprise a base rail for mounting on the vertical support. The base rail may form a ledge for extending substantially horizontally outwardly from the vertical support when the base rail is mounted on the vertical support, the base rail being elongated. The base mounting assembly may also include a base panel supportable on the base rail and having an outer surface, with a plurality of mounting apertures being formed in the outer surface of the base panel. The system may further include at least one component mounting bracket mountable on the base panel to support at least one hydronic component on the base mounting assembly, and the at least one component mounting bracket may have at least two holes simultaneously alignable with at least two of the mounting apertures of the plurality of mounting apertures in the base panel to permit a fastener to pass through a hole of the mounting bracket and a mounting aperture of the base panel aligned with each other.

In another aspect, the present disclosure relates to a combination comprising a hydronic fluid handling apparatus configured to conduct a fluid through a circuit and including a plurality of hydronic components. The combination may further comprise a hydronic apparatus support system for supporting the plurality of hydronic components of the hydronic fluid handling apparatus on a vertical support, and may include a base mounting assembly for mounting on the vertical support. The base mounting assembly may comprise a base rail for mounting on the vertical support and forming a ledge for extending substantially horizontally outwardly from the vertical support when the base rail is mounted on the vertical support, the base rail being elongated. The base mounting assembly may further comprise a base panel supportable on the base rail and having an outer surface with a plurality of mounting apertures being formed in the outer surface. The base mounting assembly may also comprise a plurality of component mounting brackets, with each component mounting bracket being mountable on the base panel to support a hydronic component on the base mounting assembly. Each of the component mounting brackets may have at least two holes simultaneously alignable with at least two of the mounting apertures of the plurality of mounting apertures in the base panel to permit a fastener to pass through a hole of the mounting bracket and a mounting aperture of the base panel aligned with each other.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
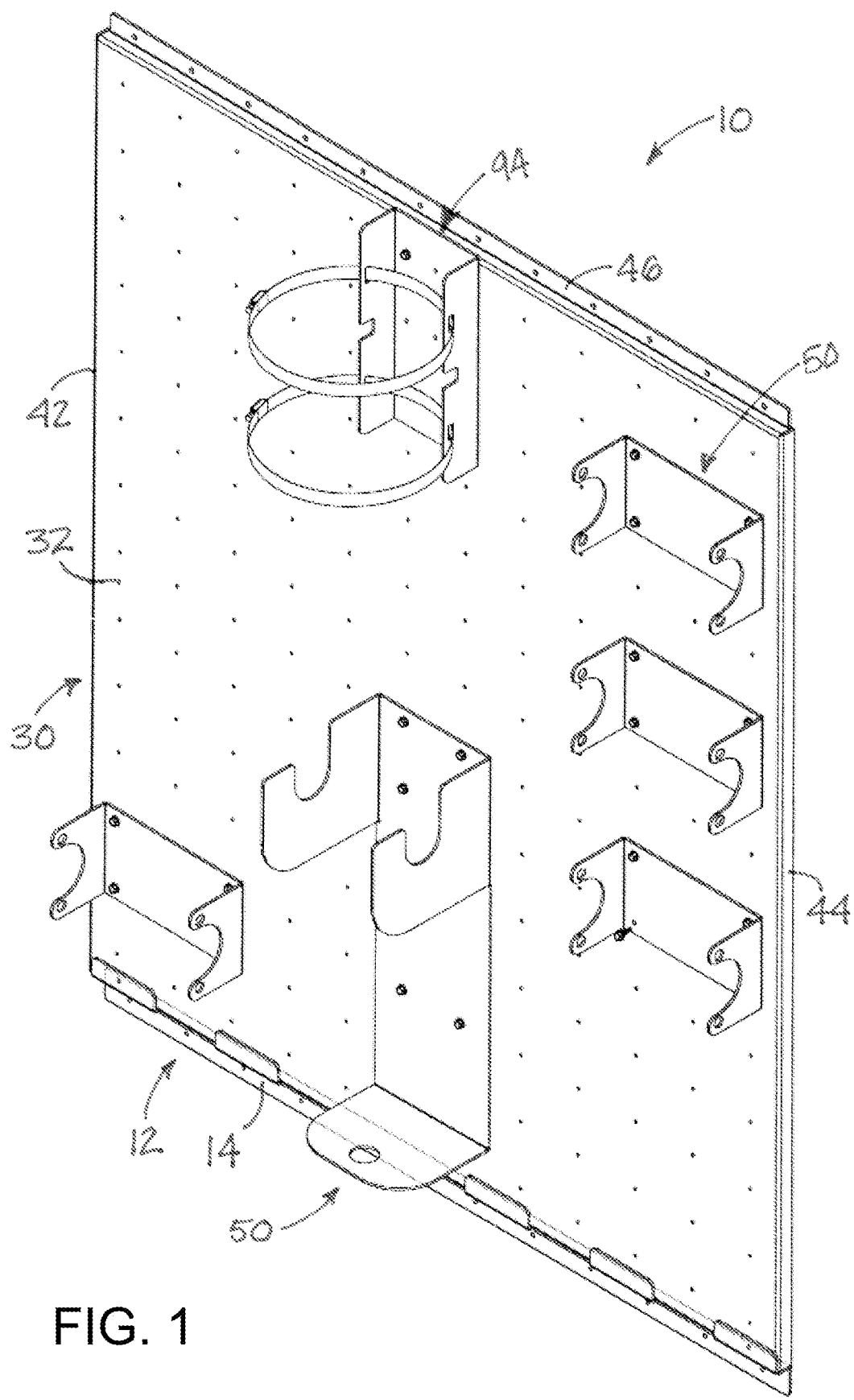
FIG. 1 is a schematic perspective view of a new hydronic apparatus support system according to the present disclosure.
Figure 2:
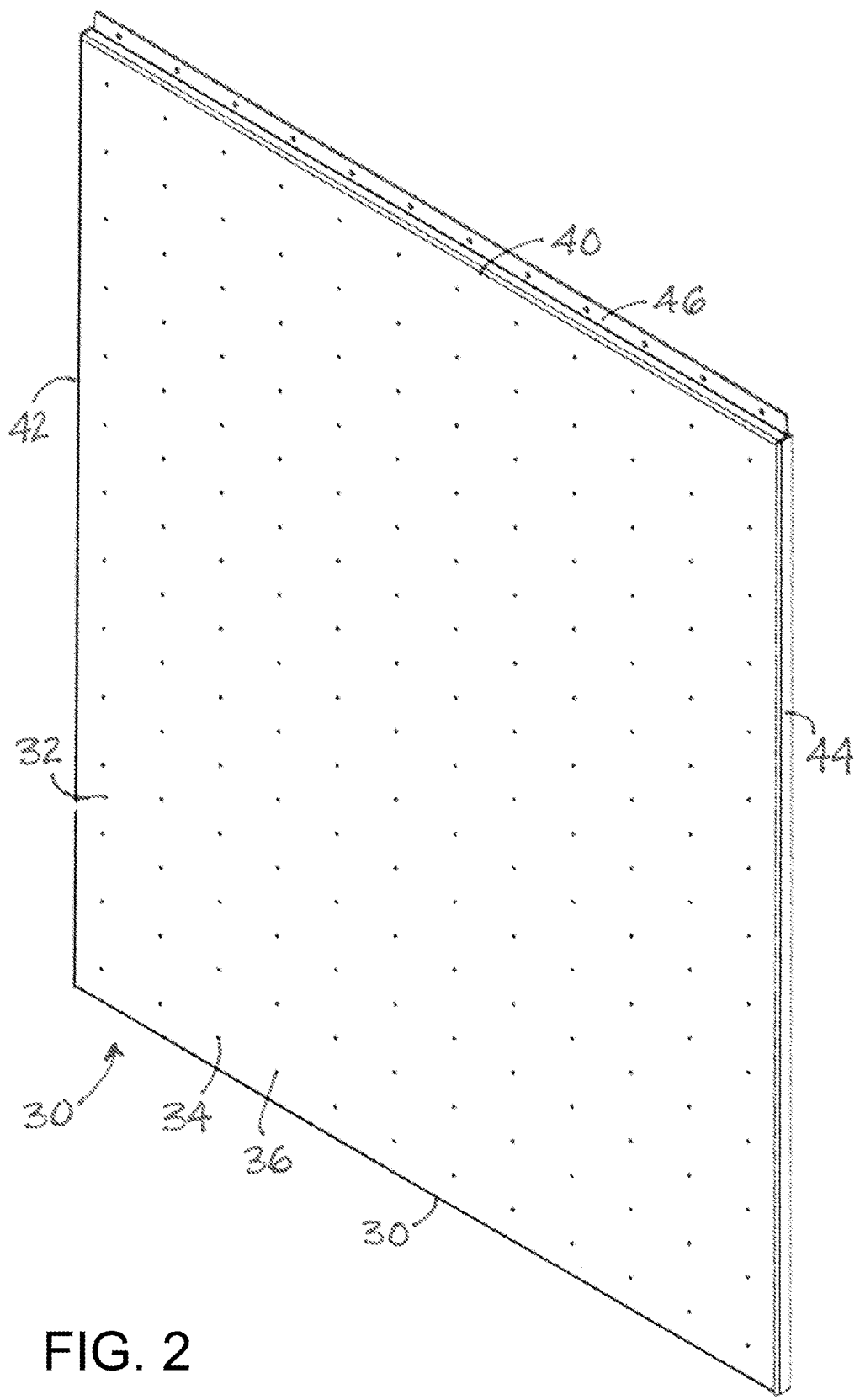
FIG. 2 is a schematic perspective view of a base panel of a base mounting assembly of the support system, according to an illustrative embodiment.
Figure 3:
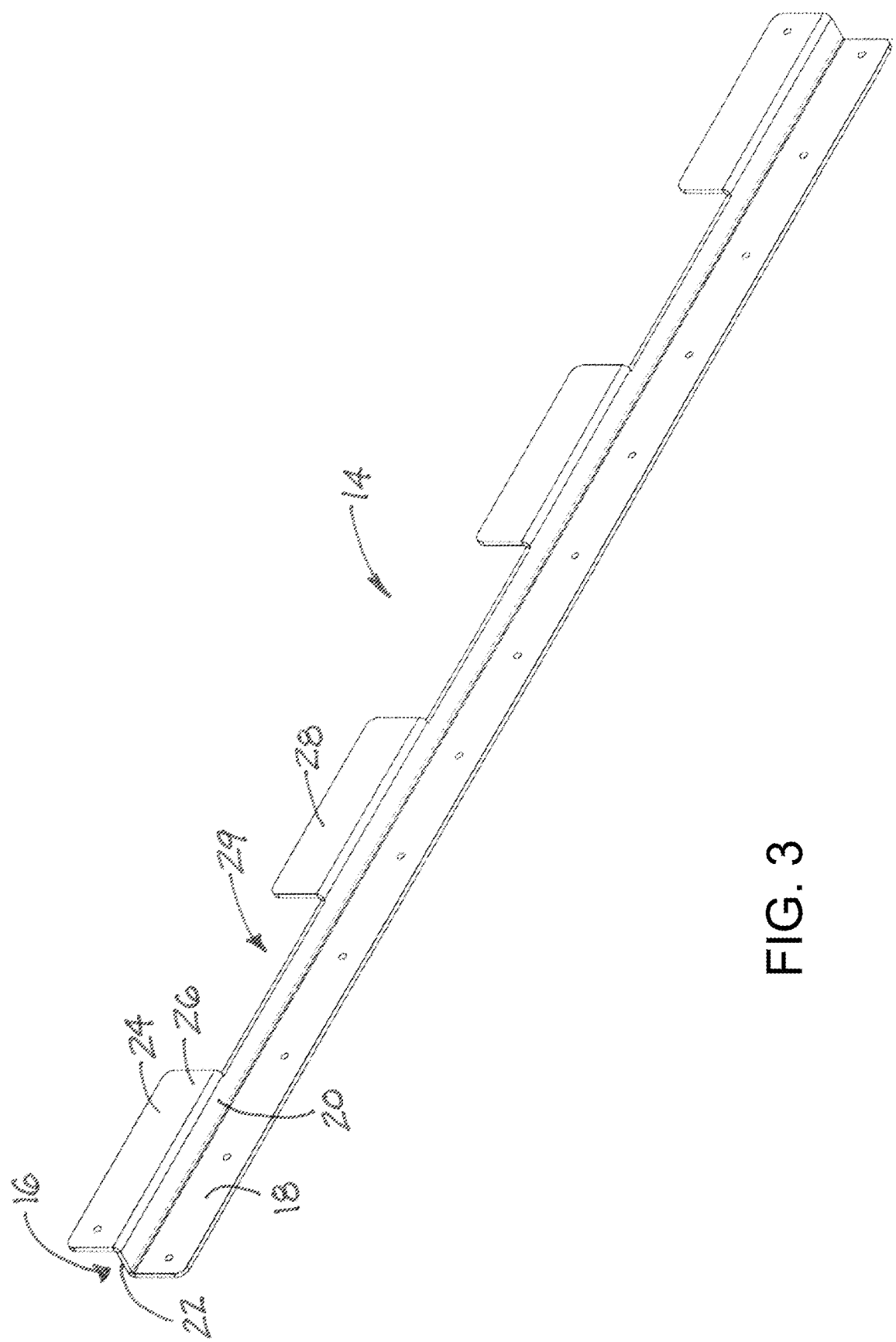
FIG. 3 is a schematic perspective view of a base rail of the base mounting assembly of the support system, according to an illustrative embodiment.

With reference now to the drawings, and in particular to FIGS. 1 through 13 thereof, a new hydronic apparatus support system embodying the principles and concepts of the disclosed subject matter will be described.

The applicants have recognized that conventional approaches to assembling and supporting components of fluid handling systems, such as hydronic heating systems, tend to be an ad hoc approaches requiring significant assembly of the components for the system, as well as mounting of the components of the system, "in the field" at the location where the system is ultimately to be utilized. Such approaches, for example, may utilize channels (such as, for example, sold under the UNI-STRUT trade name) which are mounted on to a vertical surface, and also utilize pipe clamps that clamp onto the component and then are mounted onto the channels. These ad hoc approaches can be difficult to implement under some installation conditions, and may be time-consuming to execute, particularly for less experienced installers.

The applicants have developed a support system that supports the components of a hydronic heat system, and may also facilitate the assembly of elements of the support system as well as the components of the hydronic heat system in a location that may be remote from the ultimate installation location for the heat system. Off-site assembly of elements of the support system, as well as components of the heat system, in a more controlled and convenient atmosphere, such as in the plumbing shop, can advantageously simplify and shorten the time involved with the installation process.

While it should be recognized that the support system of the disclosure can be utilized with a variety of different fluid handling systems for conducting a fluid through one or more fluid circuits, for the purposes of this disclosure an illustrative application of the support system will be described which relates to a hydronic fluid handling apparatus 1 which is generally configured to conduct a heated fluid through circuits for heating the interior of a building structure. In some implementations of the disclosure, the hydronic fluid handling apparatus 1 may include at least one hydronic component 2 which is to be supported by the support system. Illustratively, the hydronic component 1 may comprise, for example, a fluid heating device for heating the fluid, a pump for moving the fluid through at least one of the circuits, a valve for controlling movement of fluid through at least one of the circuits, a hydraulic separator for conditioning the fluid moving through at least one of the circuits, and/or an expansion tank for providing protection against excessive pressure in the closed system.

The disclosure generally relates to a hydronic apparatus support system 10 configured to support the hydronic component or components 2 of the hydronic fluid handling apparatus 1. The support system 10 may be configured to support the hydronic component on a vertical support 3 and generally to support the component in a substantially vertical arrangement. Illustratively, the support system 10 may be configured to be mounted on a wall surface of the building structure to be serviced by the hydronic fluid handling apparatus.

In general, the hydronic apparatus support system 10 may include a base mounting assembly 12 for mounting on the vertical support 3, and one or more component mounting brackets 50 which are mountable on the base mounting assembly in multiple positions on the assembly 12. Typically a plurality of the component mounting brackets 50 are utilized to each support a component 2 of the fluid handling apparatus 1.

In some greater detail, the base mounting assembly 12 may include a base rail 14 for mounting on the vertical support 3 of the building structure. The base rail 14 may form a ledge 16 for extending substantially horizontally outwardly from the vertical support when the base rail is mounted on the vertical support. Typically, the base rail 14 may be elongated in shape, with the ledge 16 extending between opposite ends of the rail 14. Illustratively, the base rail 14 may be formed from a substantially rigid sheet material, for example a metal such as aluminum.

In some embodiments, the base rail 14 may include a lower portion 18 for positioning against the vertical support 3 and which may be mountable directly on the vertical support. The lower portion 18 may be fastenable on the vertical support, and may have one or more holes for receiving fasteners to mount the lower portion 18 of the real 14 on the vertical support. When mounted on the vertical support, the lower portion 18 may be substantially vertically oriented. The base rail 14 may also include an intermediate portion 20 which may form the ledge 16 of the base rail. The intermediate portion 20 may extend from the lower portion 18, and may be oriented substantially perpendicular to the lower portion such that the intermediate portion extends substantially horizontally when the rail 14 is mounted on the vertical support. The intermediate portion 20 may have an upper ledge surface 22 which provides the ledge 16 of the base rail 14. The base rail 14 may further include an upper portion 24 which extends substantially perpendicular to the intermediate portion 20 such that the upper portion extends upwardly from the intermediate portion, and may be spaced outwardly from the vertical support, when the rail 14 is mounted on the vertical support. The upper portion 24 may include a plurality of spaced segments 26, 28, with gaps 29 therebetween, to facilitate insertion of the base panel 30 between the upper portion 24 and the surface of the vertical support.

Base mounting assembly 12 may also include a base panel 30 which may be supported on the base rail 14, such as by resting a portion of the base panel on the ledge 16 of the base rail. The base panel 30 may have an outer surface 32 which faces forwardly away from the vertical support 3 when the base panel is positioned in front of the vertical support. The base panel 30 may also have a plurality of mounting apertures 34, 36 formed in the outer surface 32 of the panel 30. The mounting apertures 34, 36 may be substantially uniformly distributed across the outer surface of the base panel, and the mounting apertures may be substantially uniformly spaced from adjacent mounting apertures on the base panel. In some embodiments, the mounting apertures may have a spacing of approximately 2 inches to 4 inches between adjacent apertures, and illustratively the mounting the apertures may have a spacing of approximately 3 inches to approximately 3.5 inches between adjacent apertures. Optionally, other spacings may also be utilized.

The base panel 30 may have a lower edge 38 and an upper edge 40, and may also have opposite side edges 42, 44 which extend between the upper 40 and lower 38 edges. The outer surface 32 may extend between the lower, upper, and opposite side edges of the base panel. The lower edge 38 of the base panel may be restable on the ledge 16 of the base rail mounted on the vertical support 3, and the base panel may be held in position on the ledge by the upper portion 24 of the rail 14. Optionally, the base panel 30 may be biased or pressed against the vertical support by the upper portion 24. The base panel 30 may further include an upper flange 46 which may be integrated with the panel 30 to provide an upper mounting point for the panel at a location opposite of the rail 14. The upper flange 46 may be located along at least a portion of the upper edge of the base panel, and may be provided with one or more holes for receiving fasteners to secure the upper flange 46, as well as the base panel, to the vertical support. Illustratively, the base panel 30 may be formed of a metal, such as aluminum. In some embodiments, the base panel 30 may have dimensions in the range of approximately 36 inches to approximately 48 inches, and illustratively may have a dimension of approximately 38 inches wide in the horizontal direction when mounted on the vertical support and approximately 45 inches in the vertical dimension when mounted on the vertical support. Optionally, additional extender panels may be provided to increase the area of the outer surface available for mounting hydronic components.

At least one component mounting bracket 50 of the support system 10 may be configured to support at least one of the hydronic components 2 on the base mounting assembly 12. The component mounting bracket 50 may be mountable on the base panel 30 of the mounting assembly 12, such as by fastening the mounting bracket to the panel 30. The component mounting bracket 50 may be positionable adjacent to, and may be abutted against, the outer surface of the base panel. As a point of reference, the component mounting bracket 50 may have a primary axis 52 which may be substantially vertically oriented when the mounting bracket is mounted on the mounting assembly for use. Various versions of the component mounting bracket 50 are contemplated by the disclosure, with features of the versions facilitating the mounting of different types of components, and different types of component design, to the base mounting assembly 12.

One feature of the various designs of the mounting brackets 50 may be a mounting portion 54 of the bracket which is configured to be mounted on the base mounting assembly 12. The mounting portion 54 may be positioned adjacent to the base panel 30 of the base mounting assembly, and may be abutted against the outer surface 32 of the panel. The mounting portion 54 may have a rear face 56 for positioning toward, and typically against, the outer surface 32 of the base panel. The mounting portion 54 may also have a front face 58 located opposite of the rear face 56. At least two holes 60, 62 may be located on the mounting portion 54 and may be positioned on the mounting portion so as to be simultaneously alignable with mounting apertures 34, 36 of the base panel. The holes may extend 60, 62 through the mounting portion 54 between the front 58 and rear 56 faces.

The mounting portion 54 has an upper extent 64 and a lower extent 66, with the upper extent 64 being positioned relatively higher than the lower extent 66 when the mounting portion is mounted on the base mounting assembly for use. The mounting portion 54 may include at least one mounting tab 70 extending laterally outwardly with respect to the primary axis 52 of the component mounting bracket.

In implementations having more than one mounting tab, the mounting tabs may extend an opposite lateral directions with respect to the primary axis 52. Further, one set of mounting tabs may be located toward the upper extent 64 of the mounting portion and an other set of the mounting tabs may be located toward the lower extent 66 of the mounting portion. Advantageously, the mounting tab or tabs 70 may provide a location or locations for additional holes for fastening the mounting portion 54 to the base panel 30 which are offset from the main section of the mounting portion. The offset location of the holes may be used to fasten the mounting portion 54 to the base panel after the component has already been mounted on the mounting bracket 50, such as when the holes on the main section of the mounting portion may be obstructed from access by a tool due to the presence of the component adjacent to the front face 58 of the mounting portion.

Another feature of the various designs of the mounting brackets 50 may be at least one flange portion 76 that extends forwardly from the mounting portion 54. The flange portion 76 may have at least one securing hole 80 formed therein, and the securing hole may be formed on the flange portion at a location spaced from the mounting portion 54. In implementations of the mounting brackets, a pair of the securing holes 80, 82 may be formed in the flange portion.

The flange portion 76 may have at least one mounting ear 84, and the securing hole 80 may be formed in the mounting ear. In some embodiments, a plurality of the securing holes 80, 82 may be formed in the mounting ear 84 with the securing holes of the mounting ear being positioned to permit different mounting orientations of the component 2 on the flange portion, 76 such as orientations which are rotated with respect to each other, such as, for example, orientations which are approximately 45 degrees apart with respect to each other.

Figure 8:
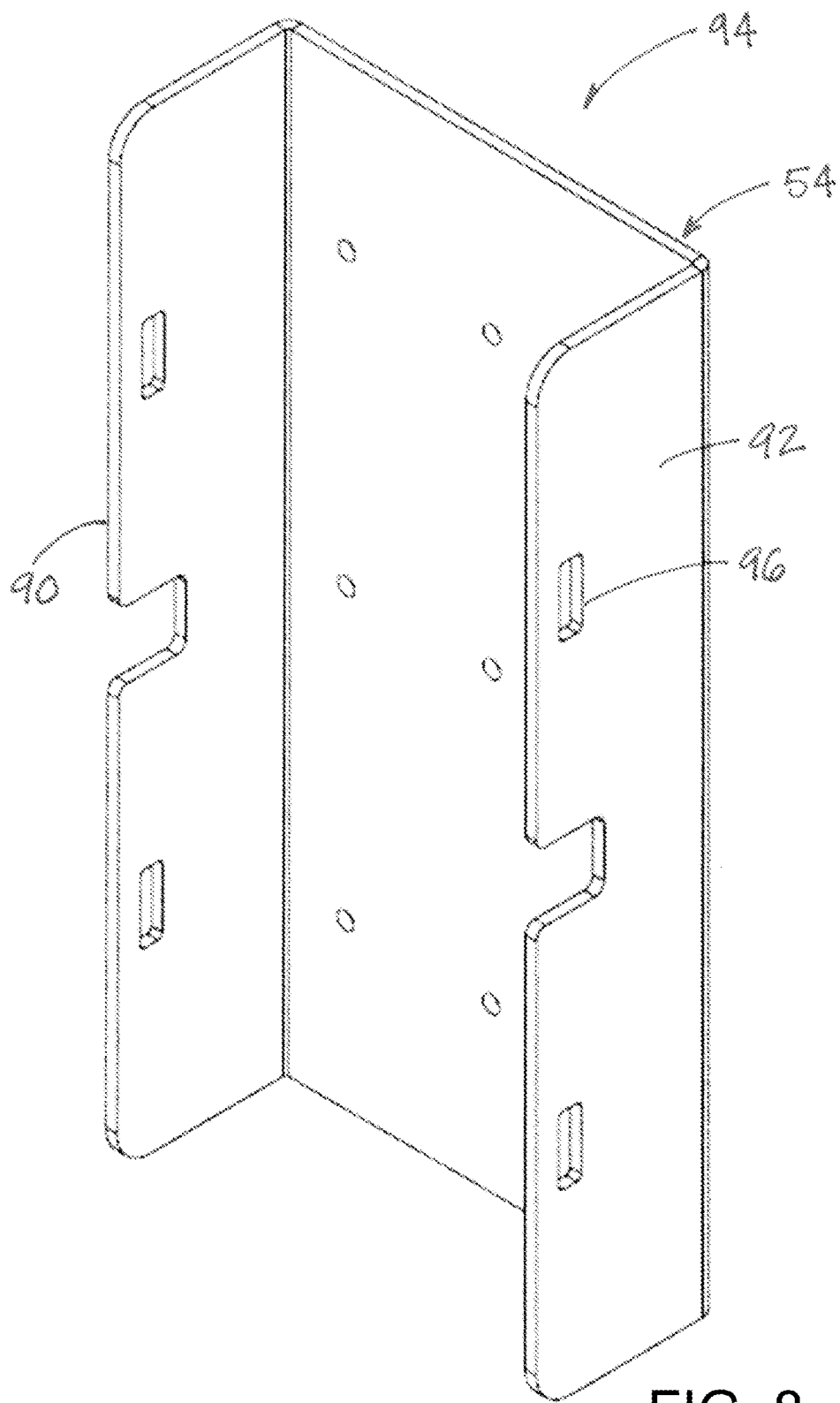
FIG. 8 is a schematic perspective view of a mounting bracket for mounting a component to the base assembly of the support system, according to an illustrative embodiment.

The flange portion 76 may include a pair of the mounting ears 84, 86 which are spaced from each other to at least partially define a component indent 88 which is configured to receive a portion of a hydronic component 2 supported on the mounting bracket 50. In some embodiments of the bracket 50, the pair of spaced mounting ears 84, 86 may be spaced in a substantially horizontal direction when the mounting bracket 50 is mounted on the base mounting assembly 12 for use, such as is shown in FIGS. 4A through 4C, 5A and 5B, and 6A through 6C. In some further embodiments of the bracket 50, the pair of spaced mounting ears 84, 86 may be spaced in a substantially vertical direction when the mounting bracket is mounted on the base mounting assembly for use, such as is shown in FIG. 8. Each securing hole 80, 82 of the pair of securing holes may be located on a respective mounting ear 84, 86 of the pair of mounting ears.

In some embodiments, each of the mounting ears 84, 86 may be substantially identical in shape, while in other embodiments the mounting ears may have different shapes. Illustratively, a first mounting ear 84 of the pair of mounting ears may extend further from the mounting portion 54 than a second mounting ear 86 of the pair of mounting ears, such as is illustrated in FIGS. 5A, 5B, 6B, and 6C. For example, the first mounting ear 84 may have a hook configuration such that the component indent is located at least partially within the hook configuration of the first mounting ear, such as is shown in FIGS. 7A through 7E.

Figure 4A:
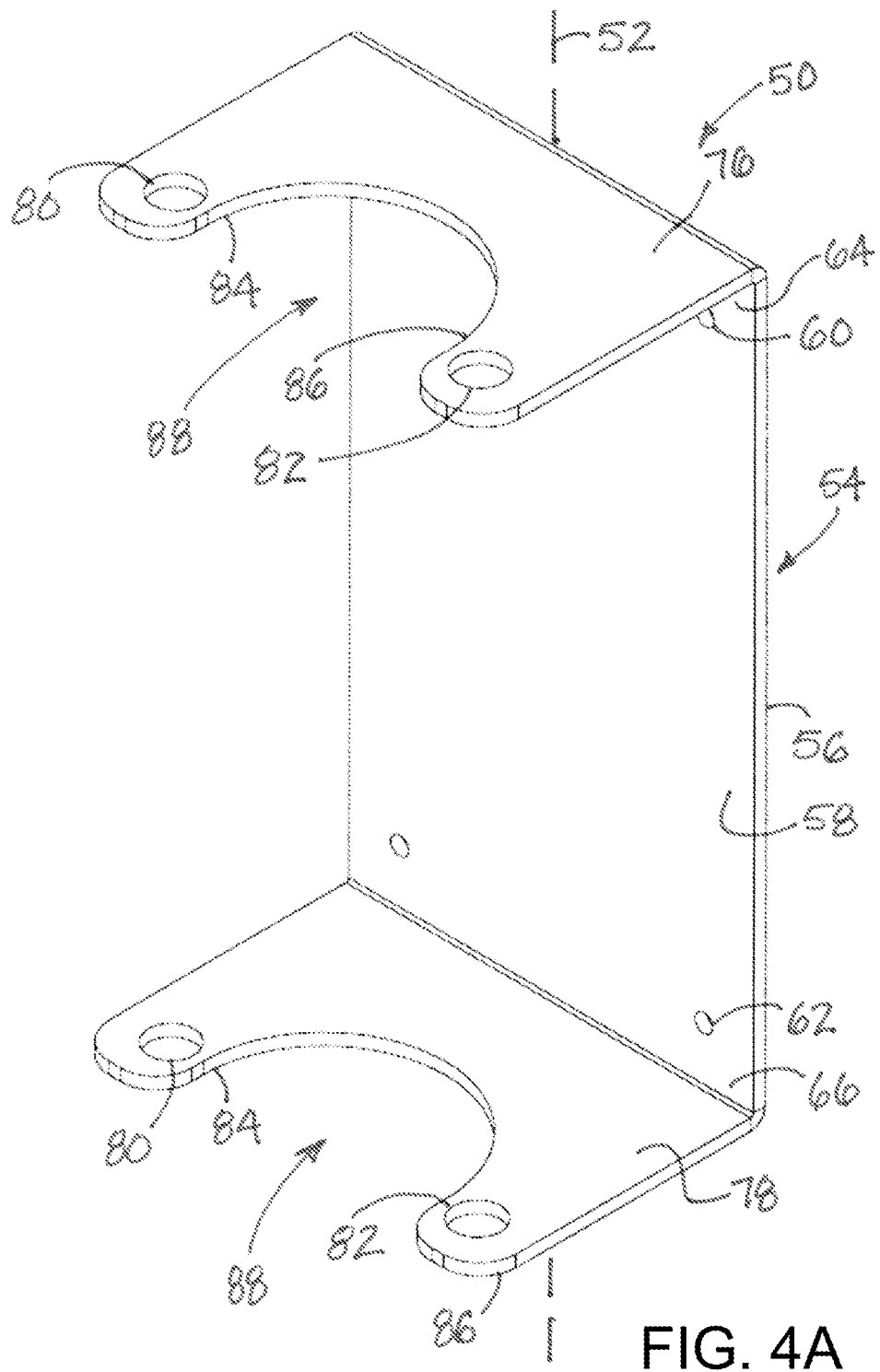
FIGS. 4A through 4C are each schematic perspective views of mounting brackets for mounting components to the base mounting assembly of the support system, according to an illustrative embodiment.
Figure 4B:
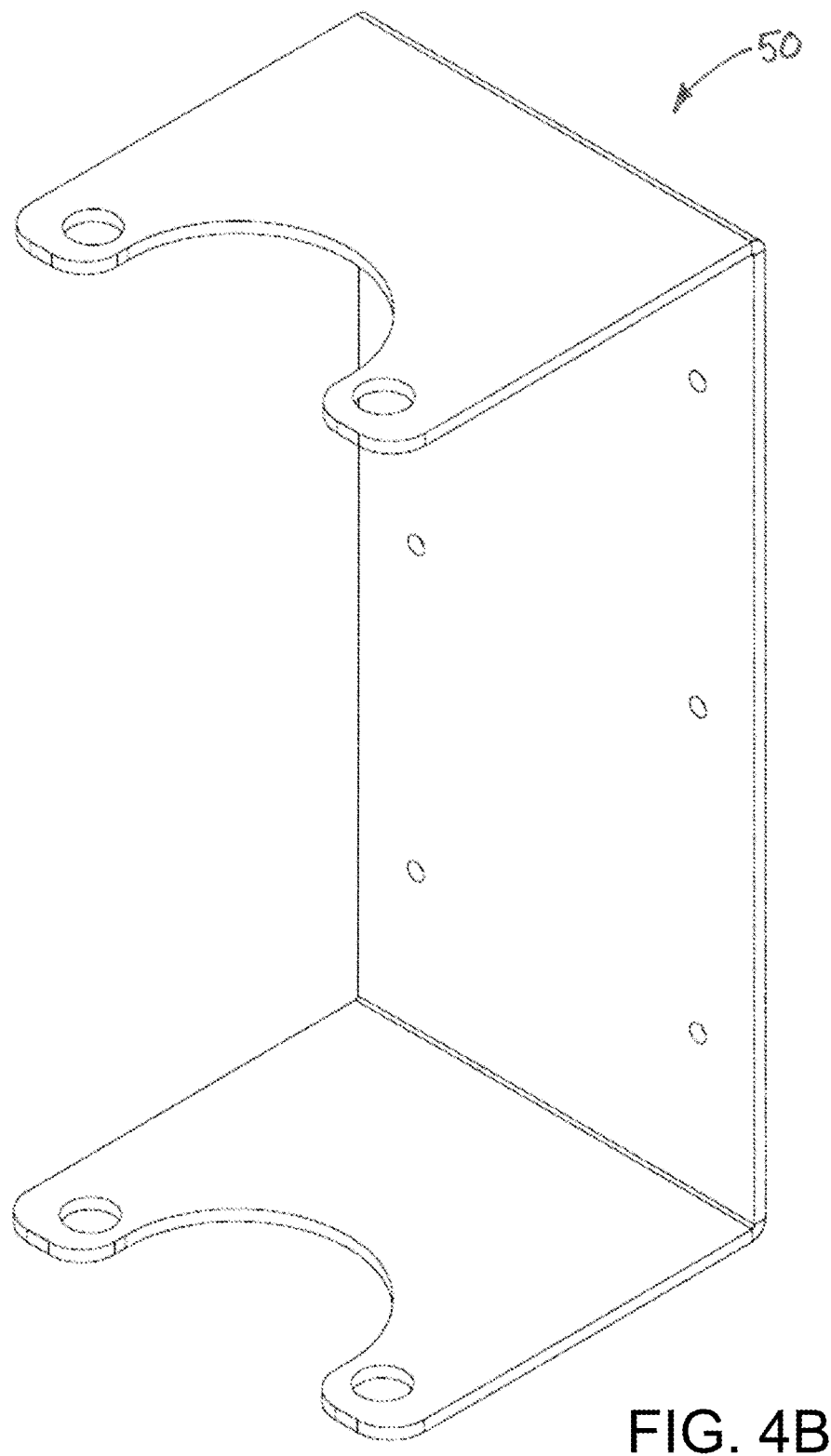
Figure 4C:
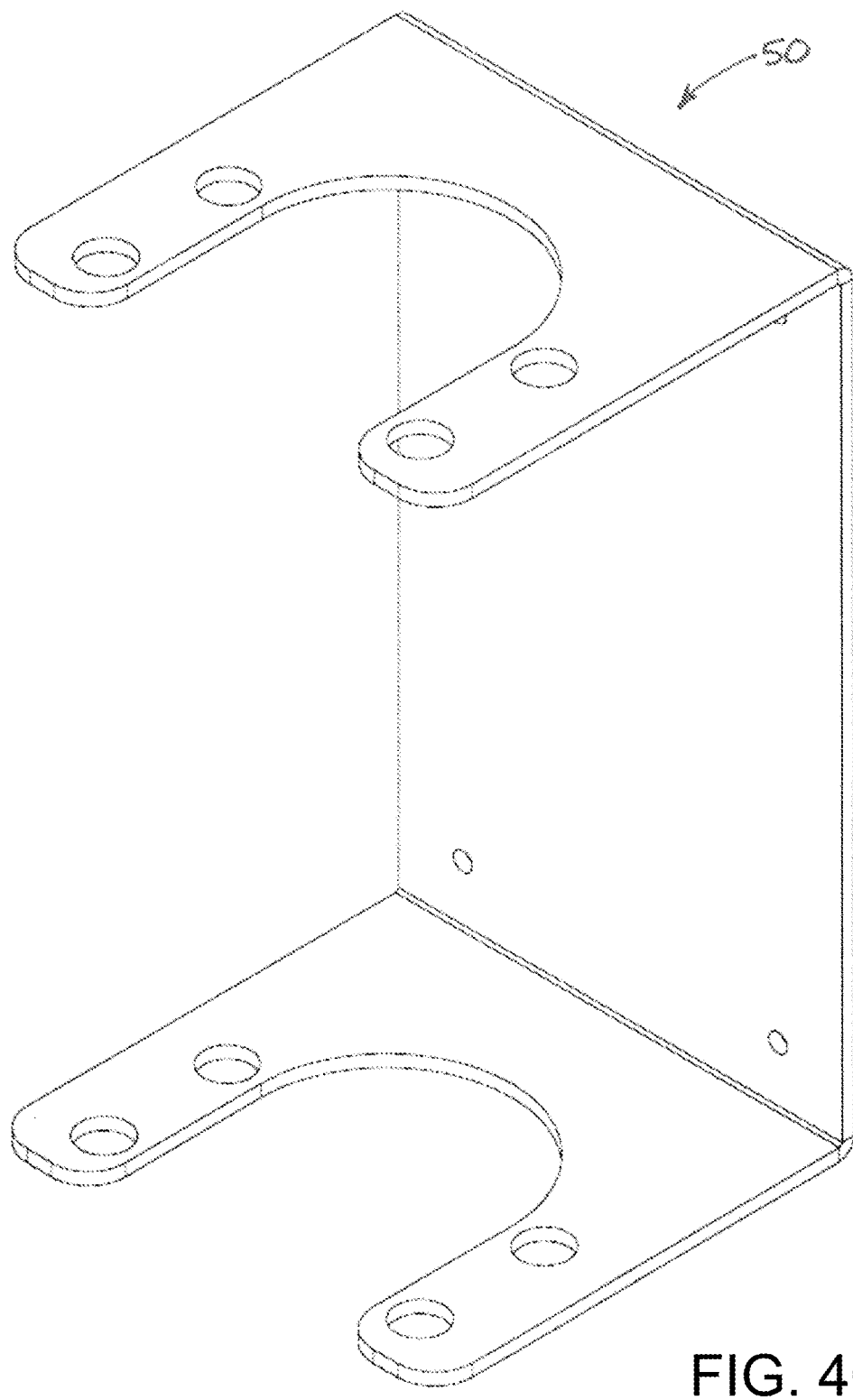
Figure 5A:
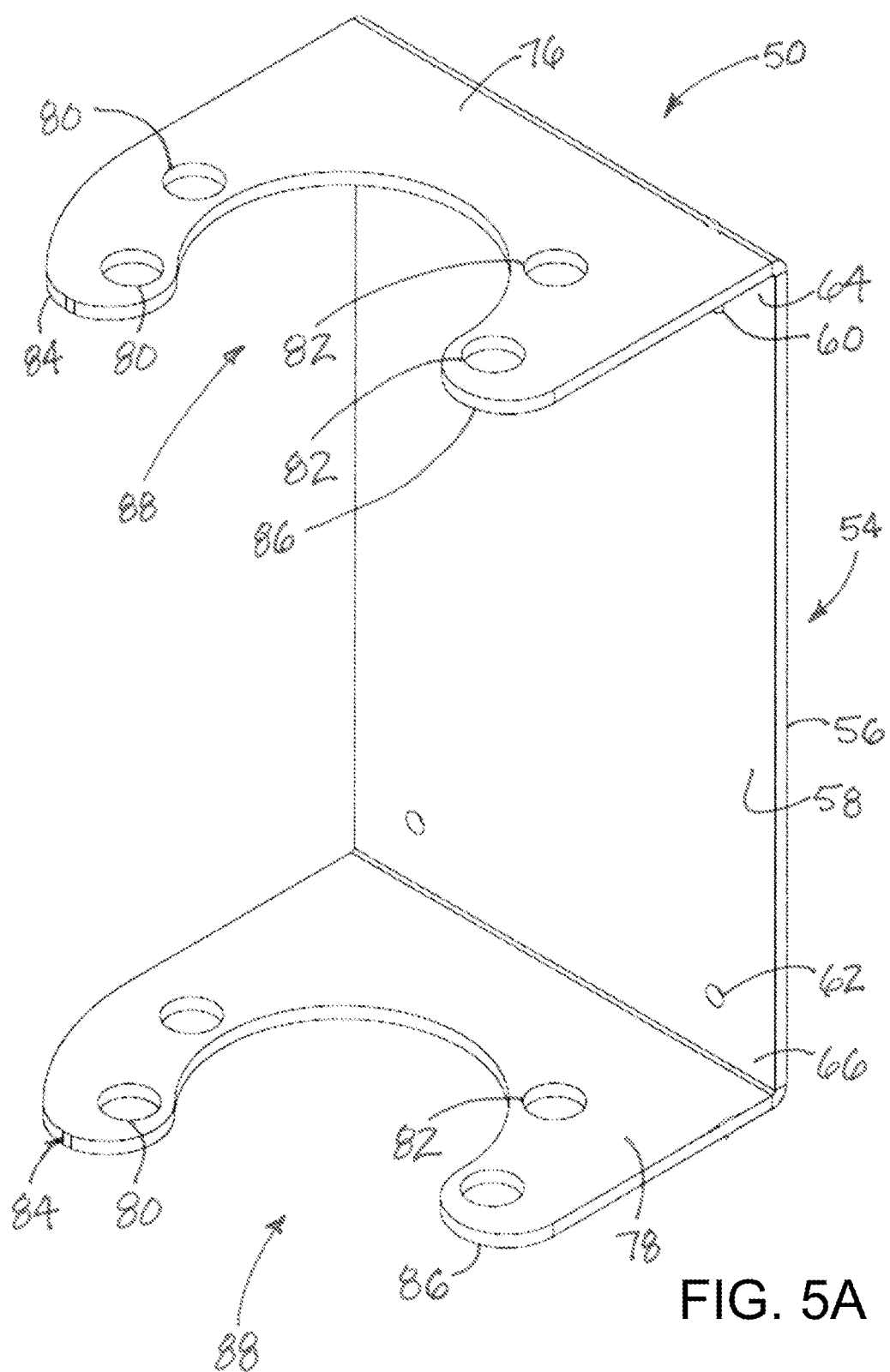
FIGS. 5A and 5B are each schematic perspective views of mounting brackets for mounting a components to the base mounting assembly of the support system, according to an illustrative embodiment.
Figure 5B:
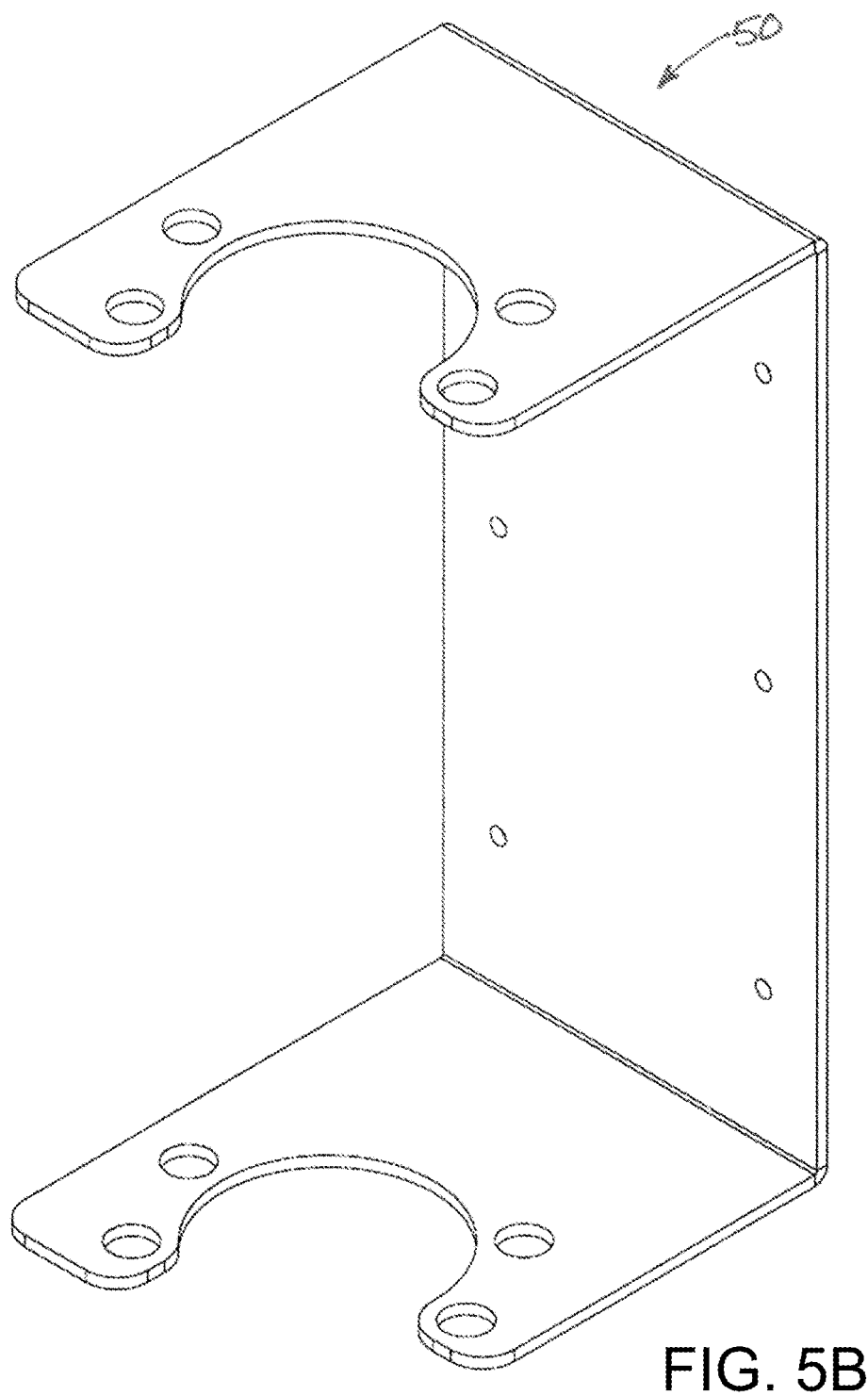
Figure 6A:
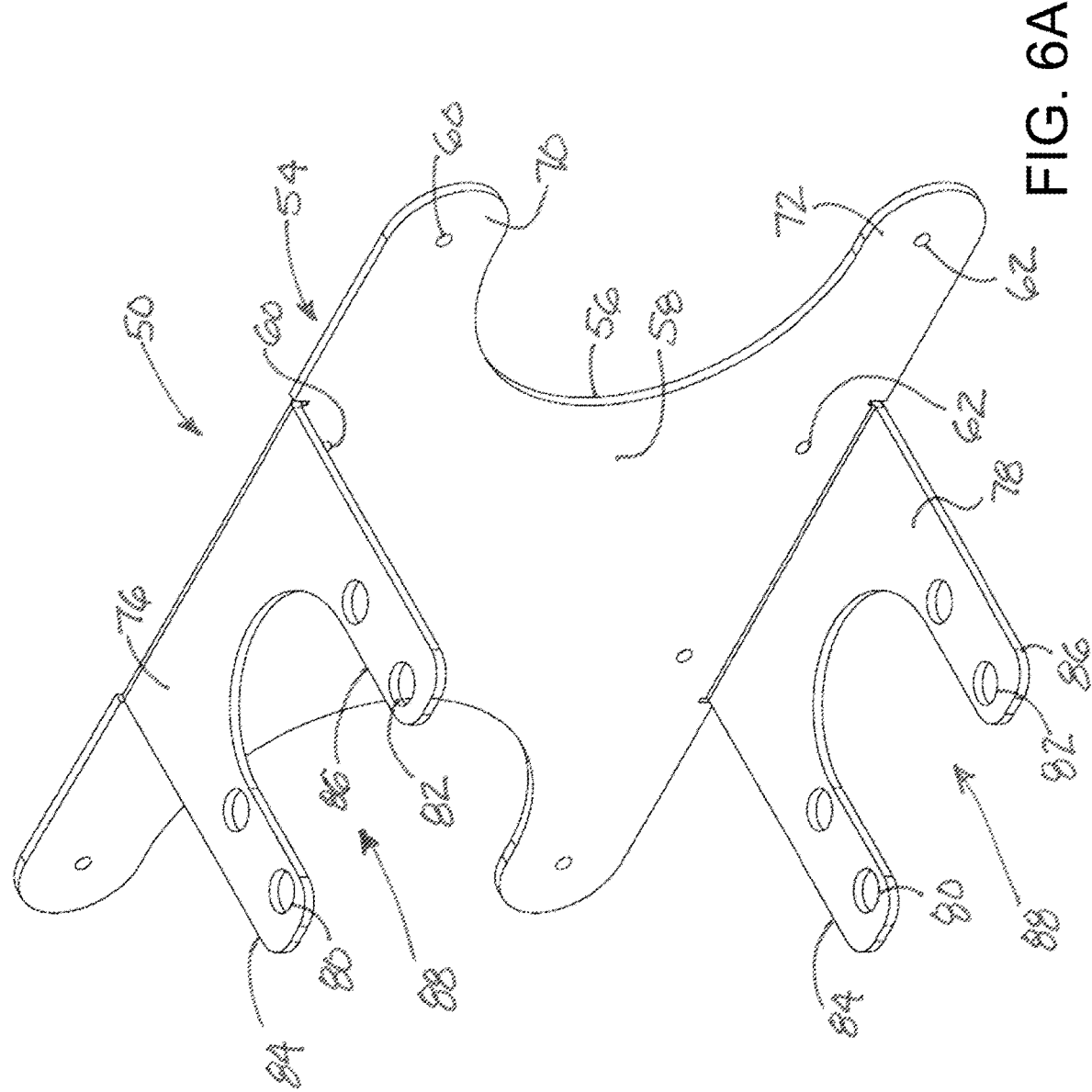
FIGS. 6A through 6C are each schematic perspective views of mounting brackets for mounting components to the base mounting assembly of the support system, according to an illustrative embodiment.
Figure 6B:
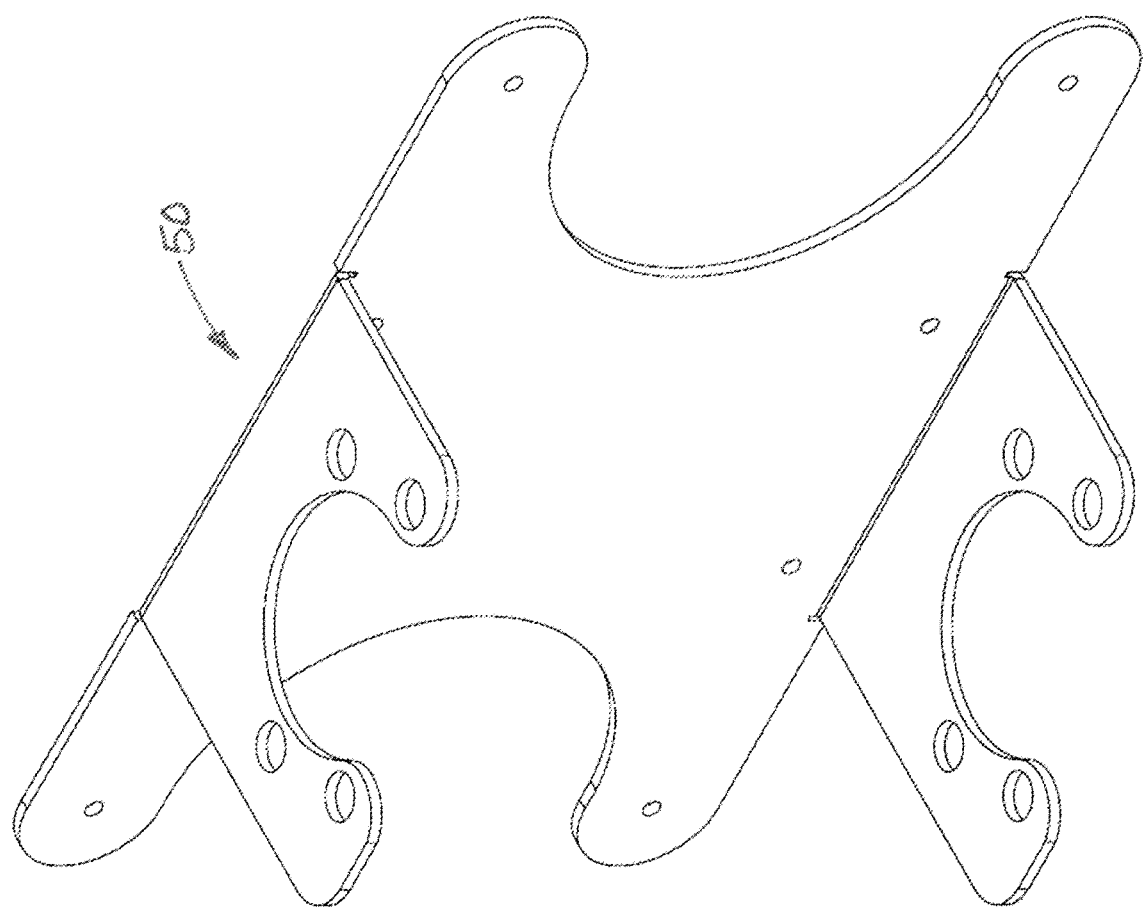
Figure 6C:
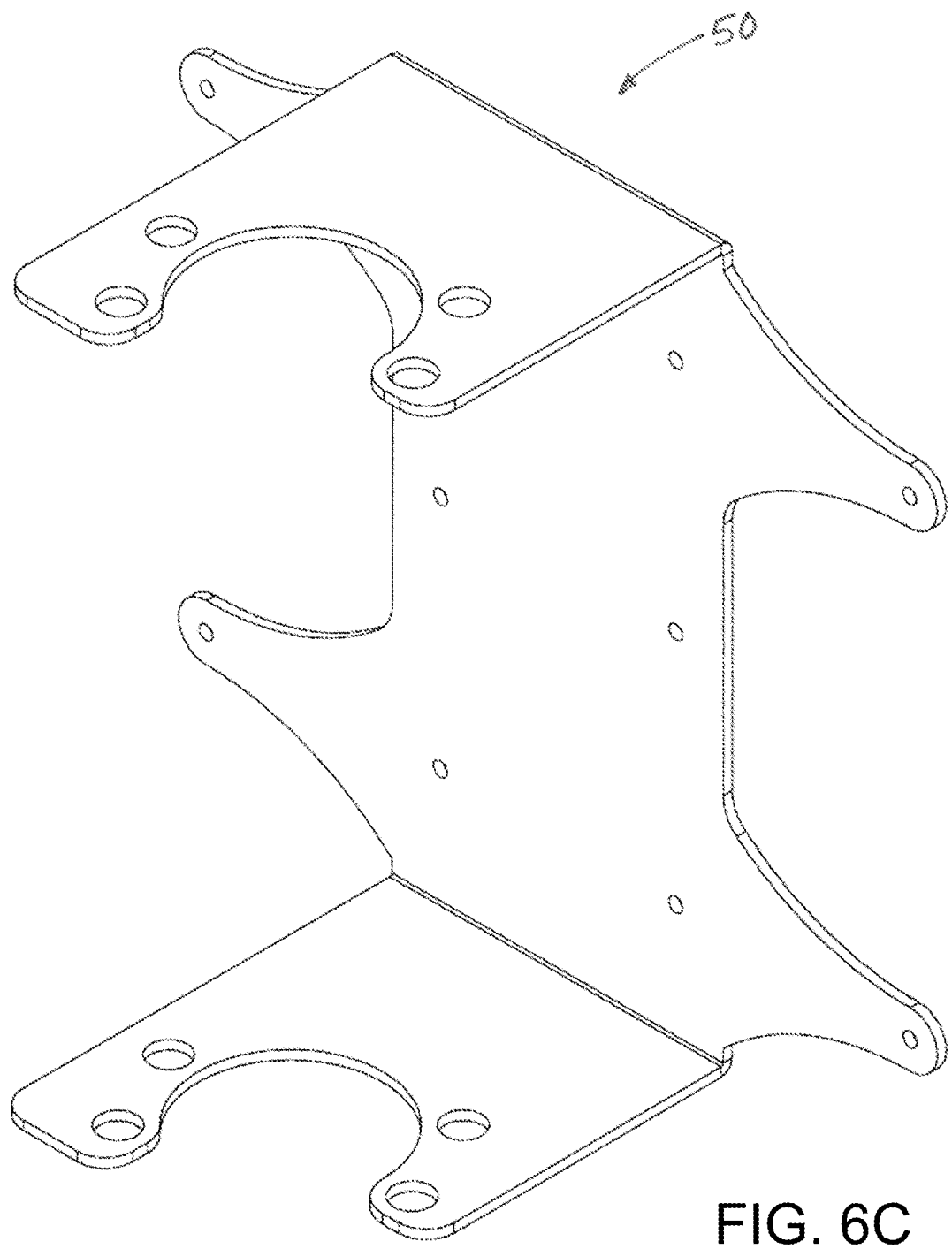
Figure 7A:
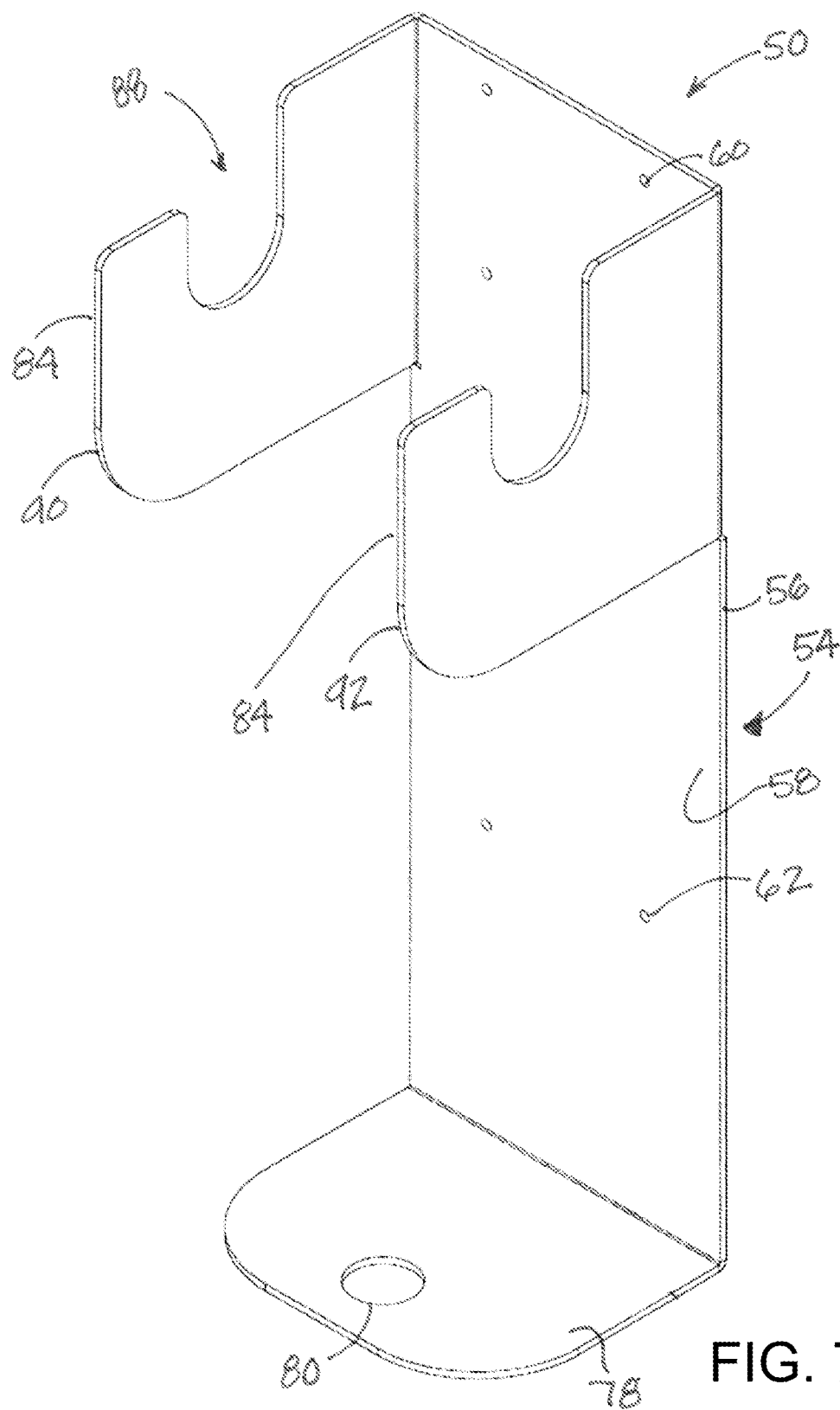
FIGS. 7A through 7E are each schematic perspective views of mounting brackets for mounting components to the base mounting assembly of the support system, according to an illustrative embodiment.
Figure 7B:
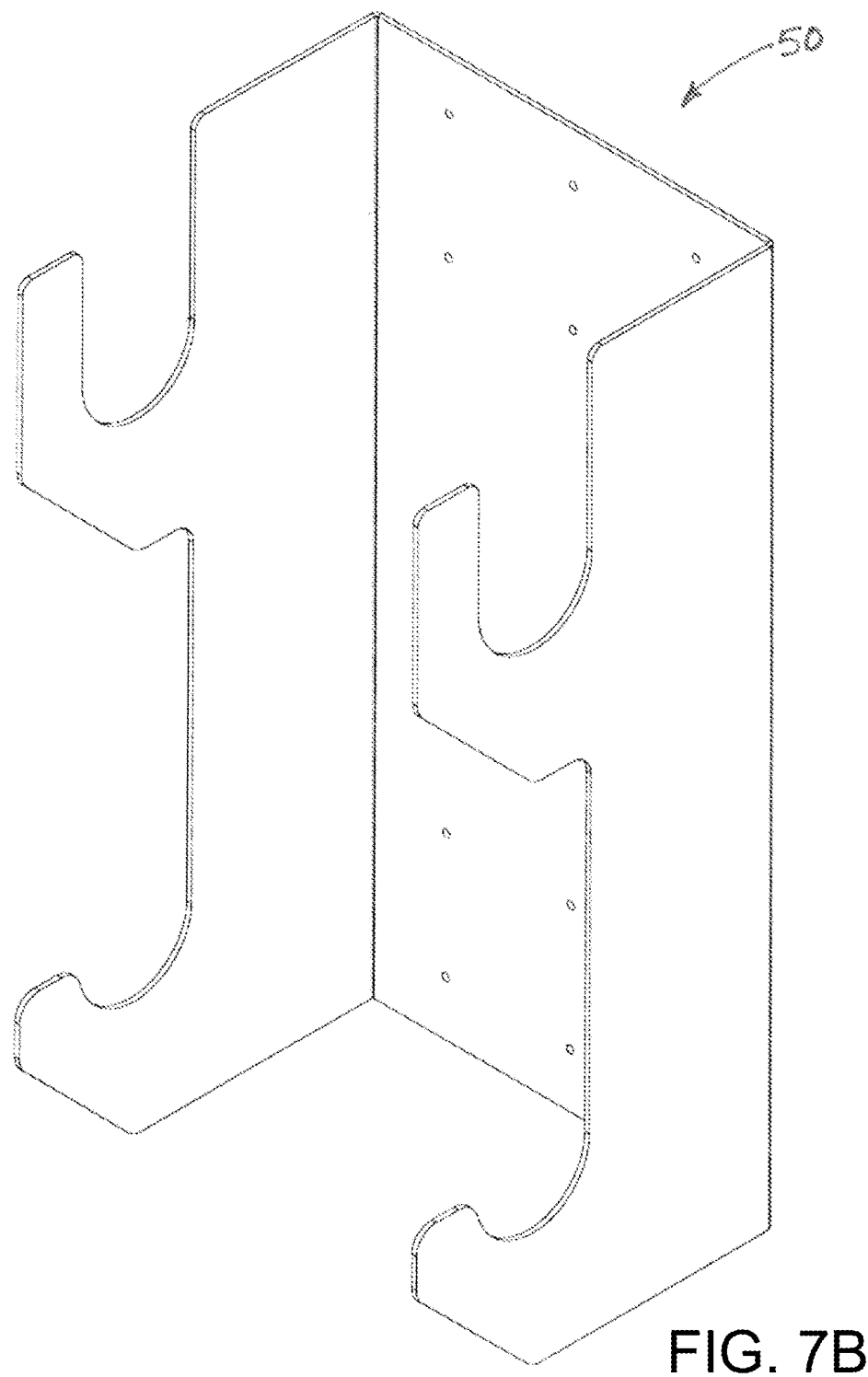
Figure 7C:
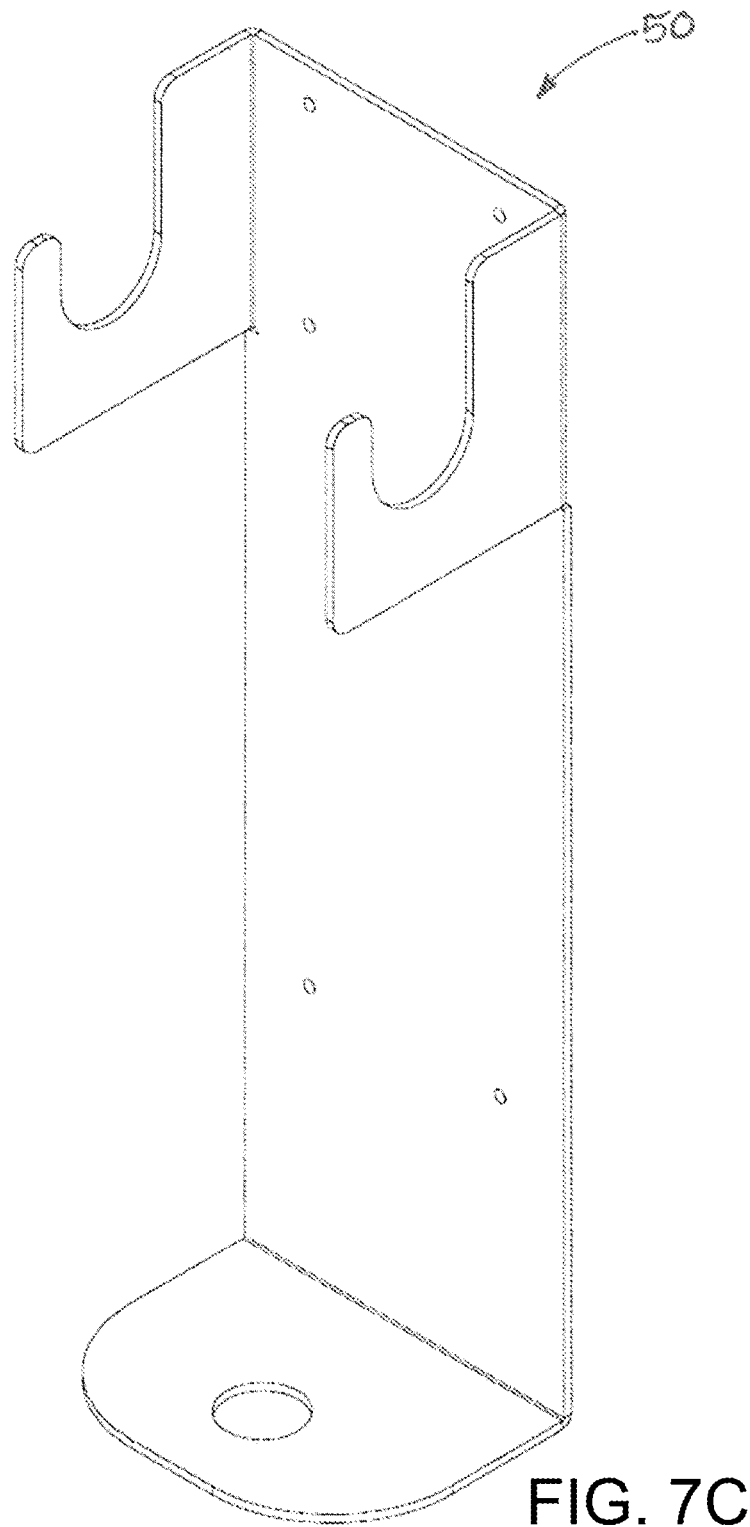
Figure 7D:
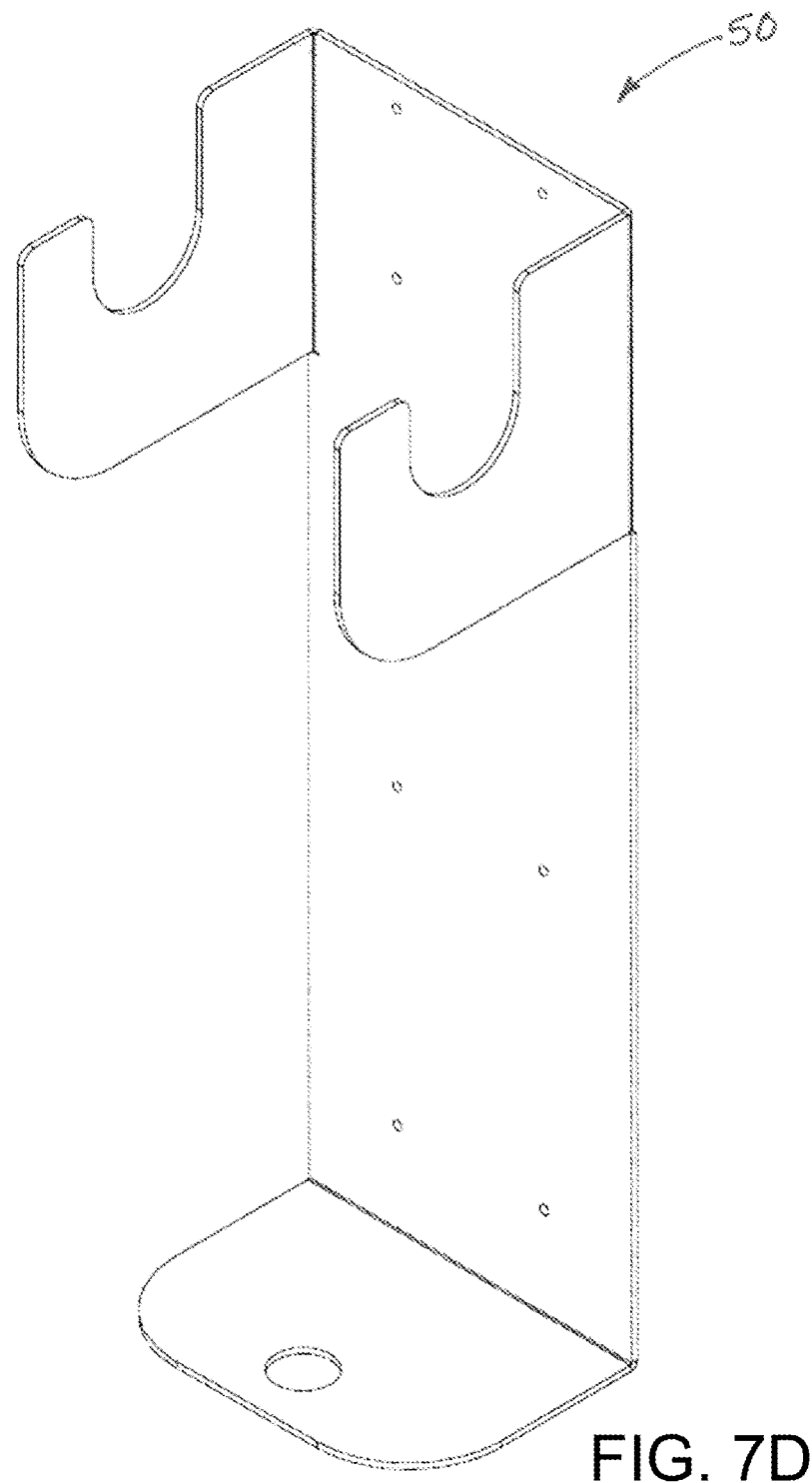
Figure 7E:
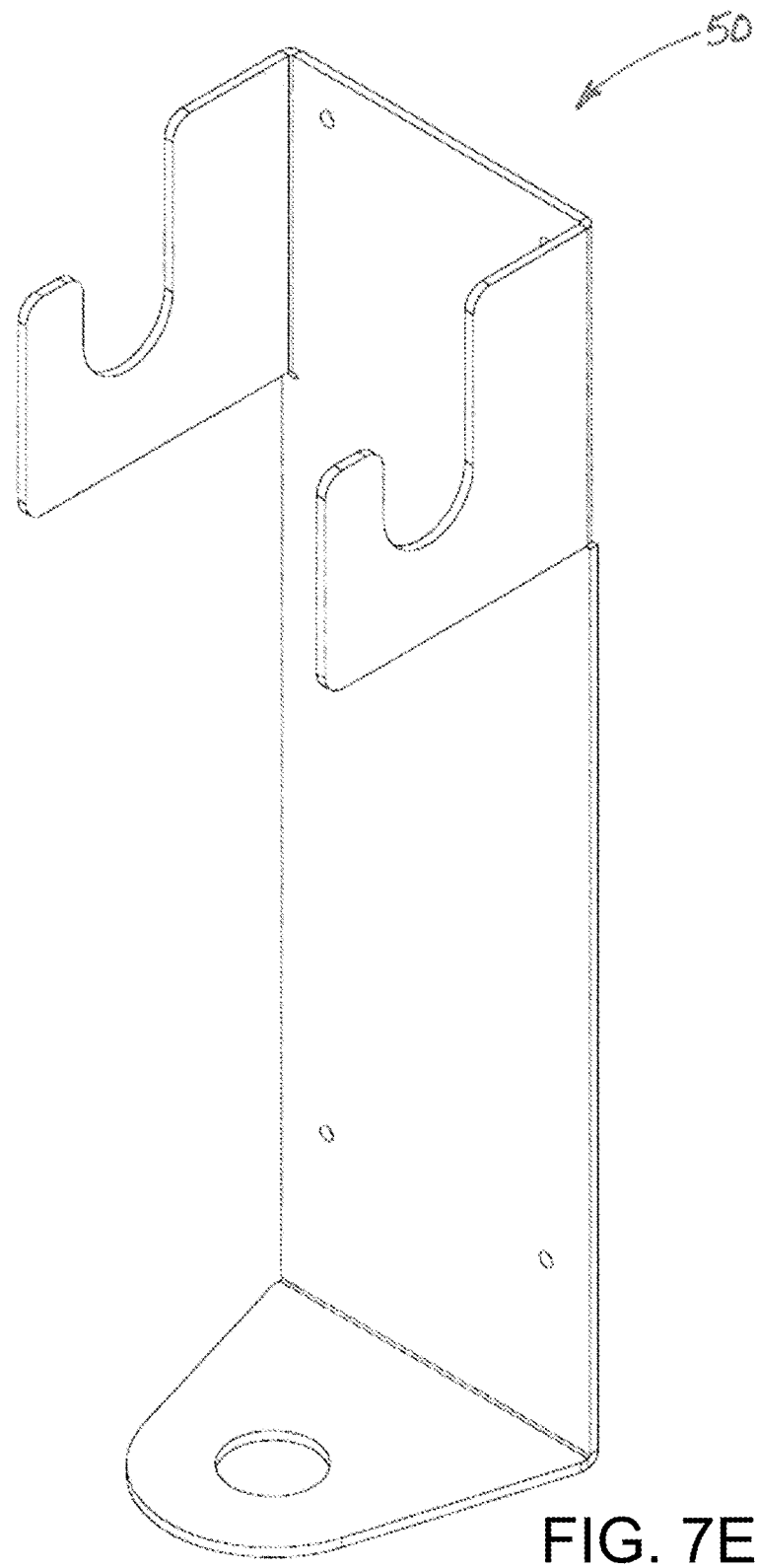

The mounting brackets 50 may include a pair of spaced flange portions 76, 78 for engaging the component 2 at two spaced locations. In some embodiments, the flange portions 76, 78 may be spaced in a substantially vertical direction with respect to each other when the mounting bracket is mounted on the base mounting assembly for use, such as is shown in FIGS. 4A through 4C, FIGS. and 5B, FIGS. 6A through 6C, and FIGS. 7A through 7E. In some embodiments, the flange portions 76, 78 may be spaced in a substantially horizontal direction when the mounting bracket is mounted on the base mounting assembly for use, such as is shown in FIGS. 7A through 7E and FIG. 8.

In the illustrative examples, the flange portion or portions may include an upper flange portion 76 which extends forwardly from the mounting portion 54, and may be located toward the upper extent 64 of the mounting portion. The upper flange portion 76 may be oriented in a substantially horizontal plane when the mounting bracket 50 is mounted on the base mounting assembly 12 for use. The flange portion or portions may also include a lower flange portion 78 that extends forwardly from the mounting portion, and may be located toward the lower extent 66 of the mounting portion. The lower flange portion 78 may be oriented in a substantially horizontal plane when the mounting bracket is mounted on the base mounting assembly for use, and the lower flange portion may be positioned below the upper flange portion 76 when the mounting bracket is mounted for use.

In the illustrative examples, the flange portion or portions may include a first side flange portion 90 extending forwardly from the mounting portion, and may be located laterally of the primary axis 52 of the component mounting bracket. The first side flange portion 90 may be oriented in a substantially vertical plane when the mounting bracket is mounted on the base mounting assembly for use. The flange portion or portions may also include a second side flange portion 92 which extends forwardly from the mounting portion, and may be located laterally of the primary axis 52 of the bracket 50. The second side flange portion 92 may be oriented in a substantially vertical plane when the bracket 50 is mounted on the base mounting assembly for use. The second side flange portion 92 may be positioned on an opposite side of the primary axis 52 with respect to the first side flange portion 90 when the mounting bracket is mounted on the base mounting assembly for use.

Various embodiments of mounting brackets 50 suitable for mounting various types of fluid pumps are shown, for example, in FIGS. 4A through 4C, FIGS. 5A and 5B, and FIGS. 6A through 6C. Various embodiments of mounting brackets 50 suitable for mounting various types of hydraulic separator's are shown, for example, in FIGS. 7A through 7E.

Another mounting bracket 94 may be configured to support an expansion tank component of the hydronic fluid handling apparatus 1, and may include one or more slots 96 for receiving binding elements that encircle the tank to bind the tank to the bracket 94.

Figure 9:
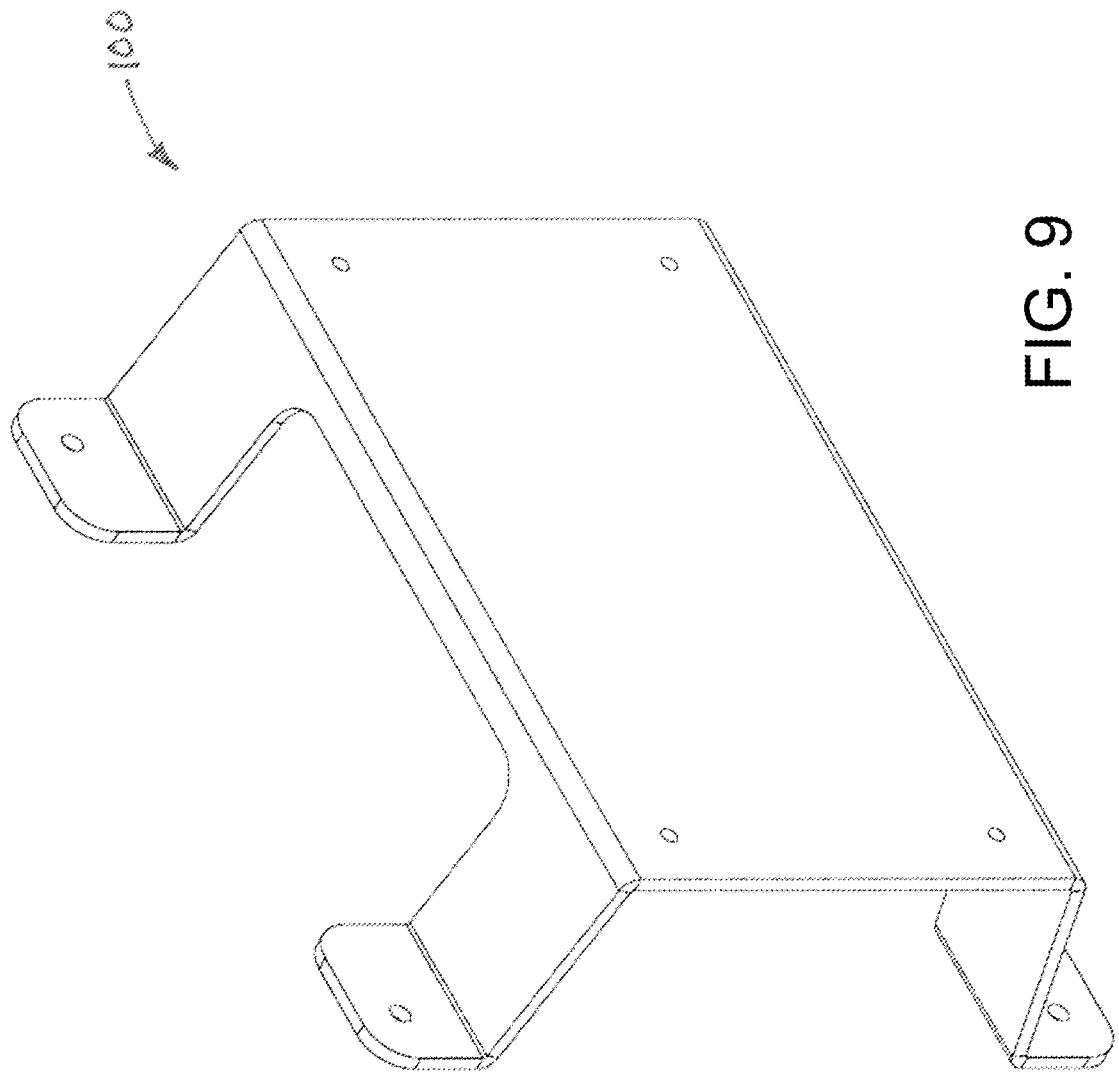
FIG. 9 is a schematic perspective view of one illustrative embodiment of a standoff bracket of the support system.
Figure 10:
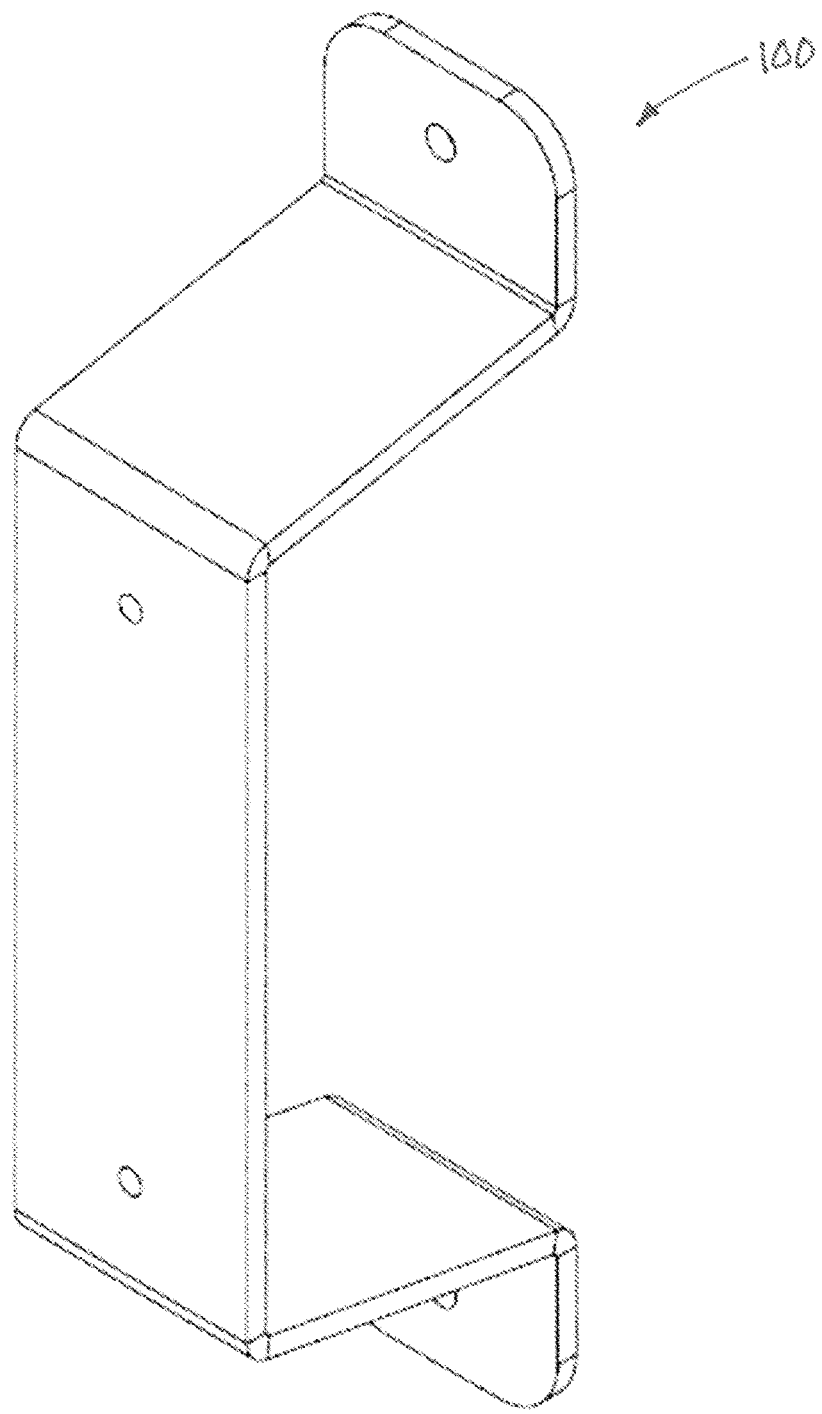
FIG. 10 is a schematic perspective view of another illustrative embodiment of a standoff bracket of the support system.
Figure 11:
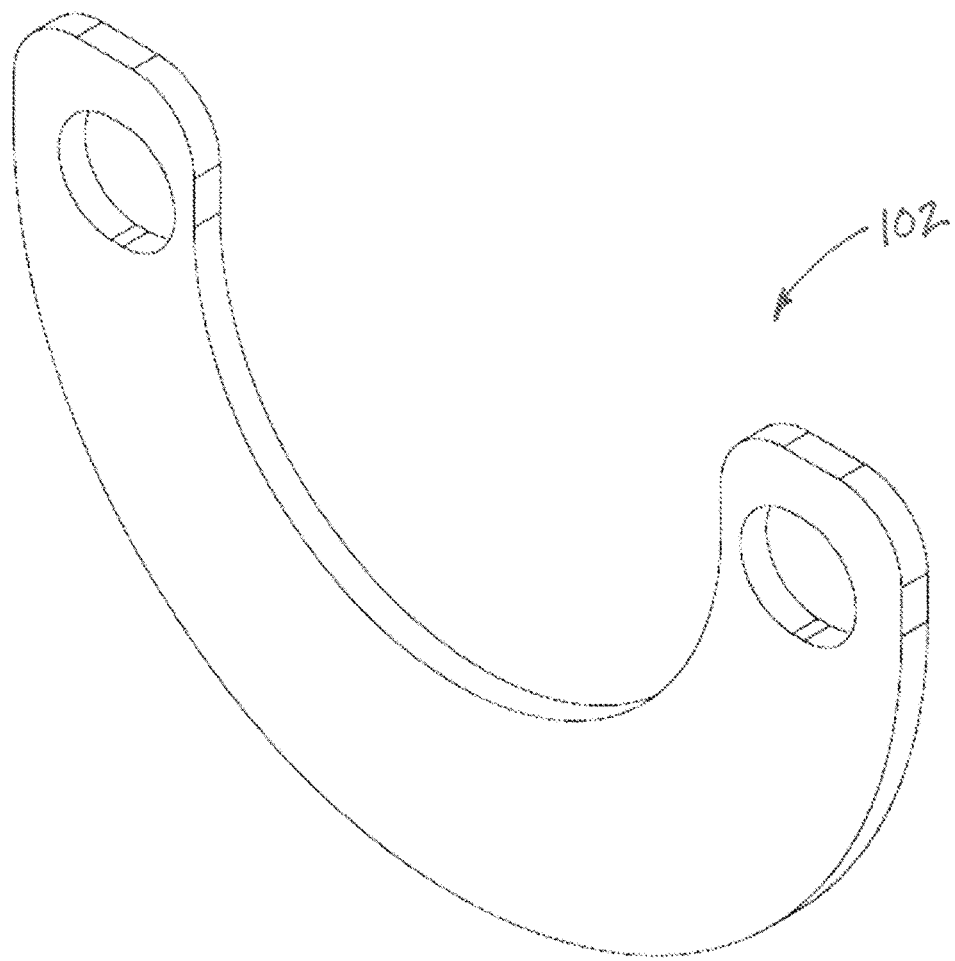
FIG. 11 is a schematic perspective view of an embodiment of a spacer element of the support system.
Figure 12:
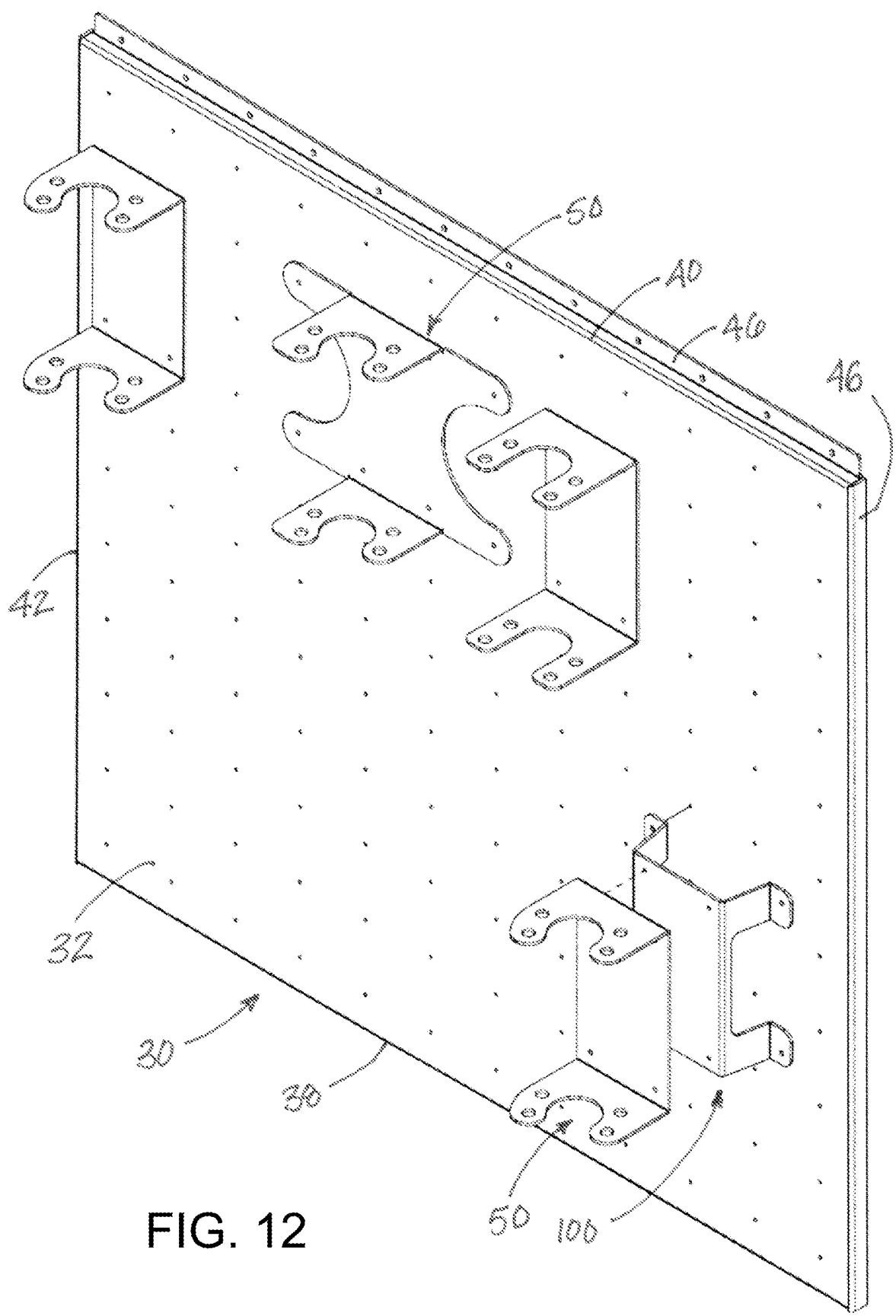
FIG. 12 is a schematic perspective view of a base panel of the base mounting assembly with various mounting brackets mounted thereon, according to an illustrative embodiment.
Figure 13:
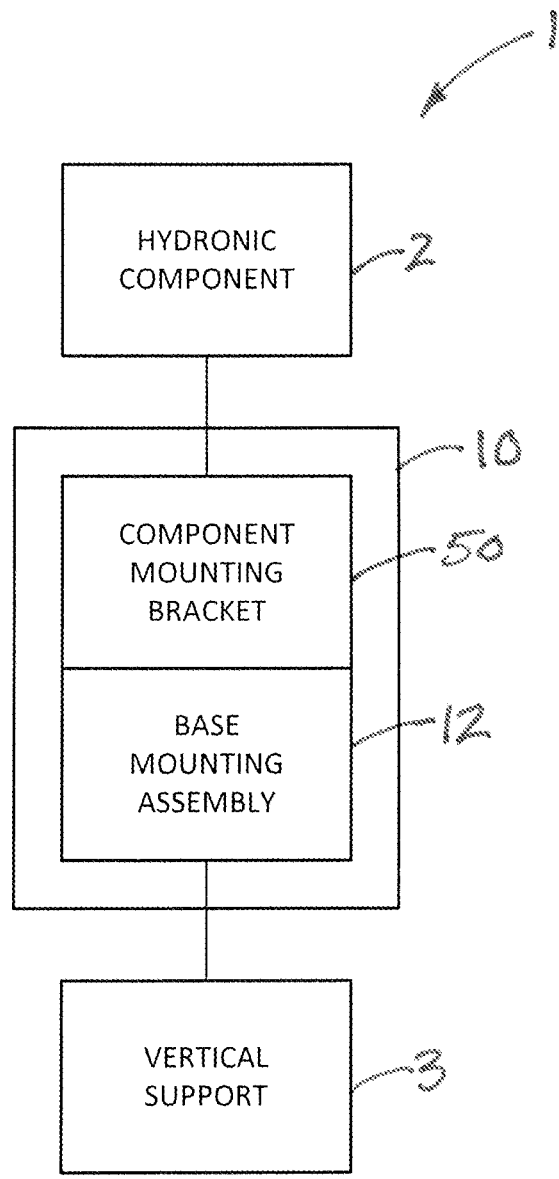
FIG. 13 is a schematic block diagram of a hydronic fluid handling apparatus including a hydronic component and the hydronic apparatus support system, according to an illustrative embodiment.

The support system 10 may also include elements for providing additional flexibility in positioning of the mounting brackets 50, and thus flexibility in positioning the mounted components 2. In some embodiments, such as is shown in FIGS. 9 and 10, a standoff bracket 100 may be provided which is configured to space a component mounting bracket 50 from the base panel 30, and the standoff bracket may be positionable between the mounting bracket 50 and outer surface 32 of the base panel. The standoff bracket 100 may be fastenable to the base panel via fasteners and the mounting apertures of the panel 30, and the mounting portion 54 of a mounting bracket 50 may be fastenable to the standoff bracket. Other additional elements may include a spacer element 102 (see FIG. 11) which may be positioned against one of the flange portions 76, 78 to effectively increase the thickness of the flange portion and correspondingly offset the mounting structure of the component 2 either above or below the position of the flange portion, when such an offset is advantageous for installation.

In use, installation may include providing elements of the apparatus support system 10, including, for example, the base rail 14 and the base panel 30 of the base mounting assembly 12, as well one or more component mounting brackets 50 suitable for mounting the components 2 of the fluid handling apparatus 1.

Initial steps of the installation may include positioning the base rail 14 against the vertical support 3, such as the vertical wall surface, at a vertical level generally corresponding to the desired position of the lower edge 38 of the base panel. The position of the base rail 14 on the vertical support, and in particular the ledge 16, may be checked for a level orientation. The base rail 14 may be mounted on the vertical support, such as by passing fasteners through the lower portion 18 of the rail 14.

The base panel 30 may then be mounted on the vertical support, and the lower edge 38 of the panel 30 may be rested upon the upper ledge surface 22 of the ledge 16 with the portion of the base panel adjacent to the lower edge being positioned between the upper portion 24 and the vertical support. The upper flange 46 of the base panel 30 may be secured to the vertical support, such as by passing fasteners through the upper flange.

Prior to the base panel 30 being mounted on the vertical support (as part of a pre-mounting assembly process), or subsequent to the base panel being mounted on the vertical support (as part of a post-mounting assembly process), one or more mounting brackets 50 (or standoff brackets) may be mounted on the base panel by aligning the two or more of the holes 60, 62 of the bracket with two or more of the mounting apertures 34, 36 of the panel and, for example, driving fasteners through the holes and into the apertures. The brackets may be arranged on the base panel in a manner that facilitates connection of the components supported by the brackets using conduits or tubing.

Hydronic components 2 may each be mounted on a respective mounting bracket 50 either as part of a pre-mounting assembly process or a post-mounting assembly process.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A hydronic apparatus support system for supporting at least one hydronic component of a hydronic fluid handling apparatus on a vertical support, the hydronic apparatus support system comprising:
   a base mounting assembly for mounting on the vertical support, the base mounting assembly comprising:
      a base rail for mounting on the vertical support, the base rail forming a ledge for extending substantially horizontally outwardly from the vertical support when the base rail is mounted on the vertical support, the base rail being elongated;
      a base panel supportable on the base rail and having an outer surface, the base panel having an upper boundary, a lower boundary, and side boundaries extending between the upper and lower boundaries;
      a plurality of mounting apertures being formed in the outer surface of the base panel; and
   at least one component mounting bracket mountable on the base panel to support at least one hydronic component on the base mounting assembly, the at least one component mounting bracket having at least two holes simultaneously alignable with at least two of the mounting apertures of the plurality of mounting apertures in the base panel to permit a fastener to pass through a hole of the mounting bracket and a mounting aperture of the base panel aligned with each other;
   wherein a first group of the mounting apertures are arranged in a first row extending across the outer surface in a direction substantially parallel to the upper boundary of the base panel and a second group of the mounting apertures are arranged in a second row extending across the outer surface in a direction substantially parallel to one of the side boundaries such that the at least two holes of the mounting bracket are alignable with mounting apertures of the first group or the second group to permit positioning of the at least one component mounting bracket at multiple locations between the upper and lower boundaries and the side boundaries of the base panel.

2. The system of claim 1 wherein the first row of mounting apertures has a linear arrangement and the second row of mounting apertures has a linear arrangement, the first linear row of mounting apertures being oriented substantially perpendicular to the second linear row of mounting apertures.

3. The system of claim 1 wherein the plurality of mounting apertures includes a plurality of the first rows, the first rows being arrayed between the upper and lower boundaries; and
   wherein the plurality of mounting apertures includes a plurality of the second rows, the second rows being arrayed between the side boundaries.

4. The system of claim 1 wherein the base panel of the base mounting assembly has a lower edge restable on the ledge of the base rail such that the base panel is supported on the base rail.

5. The system of claim 1 wherein an upper flange is integrated with the base panel along an upper edge of the base panel to provide an upper mounting point for the base panel to the vertical support.

6. The system of claim 1 wherein the at least one component mounting bracket includes:
   a mounting portion configured to be mounted on the base mounting assembly and having the at least two holes formed therein; and
   at least one flange portion extending from the mounting portion in a manner such that the at least one flange portion extends outwardly from the outer surface of the base panel when the mounting portion of the at least one component mounting bracket is fastened on the base panel, the at least one flange portion having at least one securing hole formed therein to receive a fastener for mounting the at least one hydronic component on the flange portion.

7. The system of claim 6 wherein the mounting portion of the at least one component mounting bracket has an upper extent and a lower extent, the upper extent being positioned relatively higher than the lower extent when the mounting bracket is mounted on the base mounting assembly, the at least one component mounting bracket has a primary axis extending between the upper and lower extents and being substantially vertically oriented when the at least one component mounting bracket is mounted on the base mounting assembly for use.

8. The system of claim 7 wherein the mounting portion of the at least one component mounting bracket includes at least one mounting tab extending laterally outwardly with respect to the primary axis of the component mounting bracket.

9. The system of claim 8 wherein the at least one mounting tab of the mounting portion comprises a pair of the mounting tabs with one of the mounting tabs being located toward the upper extent of the mounting portion and an other one of the mounting tabs being located toward the lower extent of the mounting portion.

10. The system of claim 6 wherein the at least one flange portion has a component indent configured to receive a portion of the at least one component supportable on the mounting bracket.

11. The system of claim 10 wherein the component indent is at least partially formed by a pair of spaced mounting ears of the at least one flange portion, each of the mounting ears having a said securing hole.

12. The system of claim 6 wherein the at least one flange portion includes a pair of spaced flange portions configured to engage spaced locations on the at least one hydronic component.

13. The system of claim 12 wherein the pair of spaced flange portions are spaced in a substantially horizontal direction when the mounting bracket is mounted on the base mounting assembly for use.

14. The system of claim 12 wherein the pair of spaced flange portions are spaced and in a substantially vertical direction when the mounting bracket is mounted on the base mounting assembly for use.

15. The system of claim 12 wherein the pair of spaced flange portions comprises an upper flange portion located toward an upper extent of the mounting portion and extending forwardly from the mounting portion; and a lower flange portion located toward a lower extent of the mounting portion and extending forwardly from the mounting portion.

16. The system of claim 15 wherein the upper flange portion and the lower flange portion are oriented substantially in a horizontal planes when the at least one mounting bracket is mounted on the base mounting assembly for use.

17. The system of claim 12 wherein the pair of spaced flange portions comprises a first side flange portion extending forwardly from the mounting portion and a second side flange portion extending forwardly from the mounting portion, the second side flange portion being located laterally of a primary axis of the component mounting bracket.

18. The system of claim 17 wherein the first and second side flange portions are oriented substantially in vertical planes when the at least one mounting bracket is mounted on the base mounting assembly for use.

19. The system of claim 1 wherein the at least one component mounting bracket includes:
   a mounting portion configured to be mounted on the base mounting assembly and having the at least two holes formed therein; and
   at least one flange portion extending from the mounting portion in a manner such that the at least one flange portion extends outwardly from the outer surface of the base panel when the mounting portion of the at least one component mounting bracket is fastened on the base panel; and
   wherein the mounting portion of the at least one component mounting bracket includes a pair of the mounting tabs with one of the mounting tabs being located toward the upper extent of the mounting portion and an other one of the mounting tabs being located toward the lower extent of the mounting portion.

20. A hydronic apparatus support system for supporting at least one hydronic component of a hydronic fluid handling apparatus on a vertical support, the hydronic apparatus support system comprising:
   a base mounting assembly for mounting on the vertical support, the base mounting assembly comprising:
      a base rail for mounting on the vertical support, the base rail forming a ledge for extending substantially horizontally outwardly from the vertical support when the base rail is mounted on the vertical support, the base rail being elongated;
      a base panel supportable on the base rail and having an outer surface, a plurality of mounting apertures being formed in the outer surface of the base panel; and
   at least one component mounting bracket mountable on the base panel to support at least one hydronic component on the base mounting assembly, the at least one component mounting bracket having at least two holes simultaneously alignable with at least two of the mounting apertures of the plurality of mounting apertures in the base panel to permit a fastener to pass through a hole of the mounting bracket and a mounting aperture of the base panel aligned with each other;
   wherein the at least one component mounting bracket includes:
      a mounting portion configured to be mounted on the base mounting assembly and having the at least two holes formed therein; and
      at least one flange portion extending from the mounting portion in a manner such that the at least one flange portion extends outwardly from the outer surface of the base panel when the mounting portion of the at least one component mounting bracket is fastened on the base panel, the at least one flange portion having at least one securing hole formed therein to receive a fastener for mounting the at least one hydronic component on the flange portion;
   wherein the mounting portion of the at least one component mounting bracket has an upper extent and a lower extent, the upper extent being positioned relatively higher than the lower extent when the mounting bracket is mounted on the base mounting assembly, the at least one component mounting bracket has a primary axis extending between the upper and lower extents and being substantially vertically oriented when the at least one component mounting bracket is mounted on the base mounting assembly for use;
   wherein the mounting portion of the at least one component mounting bracket includes at least one mounting tab extending laterally outwardly with respect to the primary axis of the component mounting bracket; and
   wherein the at least one mounting tab of the mounting portion comprises a pair of the mounting tabs with one of the mounting tabs being located toward the upper extent of the mounting portion and an other one of the mounting tabs being located toward the lower extent of the mounting portion.

21. A hydronic apparatus support system for supporting at least one hydronic component of a hydronic fluid handling apparatus on a vertical support, the hydronic apparatus support system comprising:
   a base mounting assembly for mounting on the vertical support, the base mounting assembly comprising:
      a base rail for mounting on the vertical support, the base rail forming a ledge for extending substantially horizontally outwardly from the vertical support when the base rail is mounted on the vertical support, the base rail being elongated;
      a base panel supportable on the base rail and having an outer surface, a plurality of mounting apertures being formed in the outer surface of the base panel; and
   at least one component mounting bracket mountable on the base panel to support at least one hydronic component on the base mounting assembly, the at least one component mounting bracket having at least two holes simultaneously alignable with at least two of the mounting apertures of the plurality of mounting apertures in the base panel to permit a fastener to pass through a hole of the mounting bracket and a mounting aperture of the base panel aligned with each other;
   wherein the at least one component mounting bracket includes:
      a mounting portion configured to be mounted on the base mounting assembly and having the at least two holes formed therein; and
      at least one flange portion extending from the mounting portion in a manner such that the at least one flange portion extends outwardly from the outer surface of the base panel when the mounting portion of the at least one component mounting bracket is fastened on the base panel, the at least one flange portion having at least one securing hole formed therein to receive a fastener for mounting the at least one hydronic component on the flange portion;

wherein the at least one flange portion has a component indent configured to receive a portion of the at least one component supportable on the mounting bracket; and wherein the component indent is at least partially formed by a pair of spaced mounting ears of the at least one flange portion, each of the mounting ears having a said securing hole.

* * * * *